(12) United States Patent  (10) Patent No.: US 8,052,822 B2
Datta et al.                (45) Date of Patent:     Nov. 8, 2011

(54) BLENDS OF LOW CRYSTALLINITY, LOW MOLECULAR WEIGHT PROPYLENE COPOLYMERS AND STYRENIC BLOCK COPOLYMERS

(75) Inventors: Sudhin Datta, Houston, TX (US); Mun Fu Tse, Seabrook, TX (US); Abdelhadi Sahnoune, Houston, TX (US); Charles L. Sims, Houston, TX (US); James N. Coffey, League City, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 787 days.

(21) Appl. No.: 12/032,060

(22) Filed: Feb. 15, 2008

(65) Prior Publication Data
US 2009/0205776 A1    Aug. 20, 2009

(51) Int. Cl.
B32B 27/00 (2006.01)
B32B 37/24 (2006.01)
B32B 37/00 (2006.01)
B32B 38/00 (2006.01)
B29C 65/00 (2006.01)
C08L 53/00 (2006.01)
C08L 9/00 (2006.01)
C08L 47/00 (2006.01)

(52) U.S. Cl. ............ 156/242; 156/281; 525/89; 525/95; 525/98

(58) Field of Classification Search .......... 156/242, 156/281; 525/89, 95, 98
See application file for complete search history.

(56) References Cited

U.S. PATENT DOCUMENTS

| 3,830,767 A | 8/1974 | Condon |
| 4,775,711 A | 10/1988 | Kawamura et al. |
| 5,036,034 A | 7/1991 | Ewen |
| 2004/0253464 A1 | 12/2004 | Krawinkel |
| 2007/0021566 A1 | 1/2007 | Tse et al. |
| 2007/0240605 A1 | 10/2007 | Iyer et al. |
| 2008/0032079 A1 | 2/2008 | Sahnoune et al. |

FOREIGN PATENT DOCUMENTS

| EP | 0 742 227 | 3/2001 |
| GB | 1 230 297 | 8/1968 |
| GB | 1 373 711 | 1/1971 |
| JP | 50-14742 | 2/1975 |
| JP | 52-65551 | 5/1977 |
| JP | 58-20664 | 2/1983 |
| JP | 58-215446 | 12/1983 |
| JP | 61-014248 | 1/1986 |
| JP | 2004-250578 | 9/2004 |
| WO | WO 2006/020309 | 2/2006 |
| WO | WO 2007/120147 | 10/2007 |

Primary Examiner — Philip Tucker
Assistant Examiner — Michael Orlando

(57) ABSTRACT

Styrenic block copolymers are blended with propylene copolymers to provide polymeric compositions with an improved balance between processability and elasticity. The compositions have improved processability by facilitating the ease with which a rubbery material, usually difficult to melt process, can be processed at high line speeds, which in turn improves the formation of the composition into films or other articles, assisted by a desired level of melt elasticity, i.e., a high elastic extension and recovery.

20 Claims, 5 Drawing Sheets

BLENDS OF LOW CRYSTALLINITY, LOW MOLECULAR WEIGHT PROPYLENE COPOLYMERS AND STYRENIC BLOCK COPOLYMERS

FIELD OF THE INVENTION

The invention relates to blends of styrenic block copolymers including a partially crystalline propylene copolymer to improve processability, and methods of making and using such blends.

BACKGROUND OF THE INVENTION

Many thermoplastic elastomer compositions exhibit a trade-off between processability and physical properties. For example, elastomers with beneficial physical properties such as ethylene-propylene copolymers (EP's), styrenic block copolymers (SBC's), and polyurethanes are difficult to process into useful articles. Among these elastomers, increases in hardness, flexural modulus, and tensile strength are typically accompanied by losses in elastic properties, such as elastic recovery and hysteresis. In particular, SBC's used in elastomeric applications suffer from the disadvantage that they cannot be drawn to desired thicknesses and must be blended with other materials such as ethylene vinyl acetate copolymers, ethylene methacrylate copolymers, or low density polyethylene plastomers to achieve beneficial processability characteristics. However, the use of such processing aids leads to loss of the desirable chemical and mechanical properties of the SBC.

Polyolefin thermoplastic elastomers comprising blends of propylene polymers with non-crystalline ethylene-α-olefin random copolymers or with hydrogenated products of styrene-butadiene-styrene block copolymers are disclosed in Japanese laid-open patent application Nos. Sho 50-14742/1975, Sho 52-65551/1977, Sho 58-20664/1983, and Sho 58-215446/1983. However, elastomeric compositions obtained by blending propylene polymers with SBC's and further with hydrocarbon oils for improving flowability, have a drawback that when molded, the mechanical strength properties, e.g. tensile strength and flexural modulus, of the resulting molded products are lower. Further, elastomeric compositions obtained by blending propylene polymers with non-crystalline ethylene-α-olefin random copolymers have good rubber elasticity, but on the other hand, they have high compounding viscosities.

Similarly, Japanese laid-open patent application No. Sho 61-14248/1986 discloses an elastomeric composition obtained by blending propylene-ethylene block copolymers with SBC's, and if necessary, non-crystalline ethylene-propylene rubbers. However these blends suffer from high compound viscosity leading to difficult fabrication and surface marks.

US 20070240605 (also published as EP 1778781 and WO 06020309, incorporated by reference herein) discloses SBC's used in conjunction with propylene dominated elastomers such that the combinations are found to have desirable elastomeric properties, while at the same time exhibiting beneficial processability characteristics. However, none of the example data disclose SBC formulations having simultaneously a melt flow rate of at least 50 dg/min and a flexural modulus less than 100 MPa. Further improvements in balancing the elastomeric properties and processability characteristics of blends containing SBC are desired.

It has been discovered herein that styrenic block copolymers blended with certain low molecular weight polymer materials incorporating propylene-derived units provide polymeric compositions with an improved balance between processability and elasticity. The improved processability of the compositions arising from the use of these propylene copolymers relates to the ease with which a rubbery material, usually difficult to extrude, can be extruded at high line speeds, which in turn influences the draw-down into films from an extrusion die and is assisted by a desired level of melt elasticity, i.e., a high elastic extension and recovery, even after many cycles. More specifically, in certain embodiments, the polymeric compositions described herein provide additional control of processability, softness and service temperature without significantly detracting from underlying tensile and permanent set characteristics. Most importantly, in blends with styrenic block copolymers the propylene copolymers are able to form soft, malleable and easily processable compositions, whereas similar blends, where process oils are substituted for all or part of the propylene copolymers, form powdery or granular mixtures which are neither malleable nor easily processed.

The propylene copolymers have limited crystallinity resulting from a controlled disruption in isotactic propylene sequences of the polymer, which leads to improved processing of the styrenic block copolymers and retention of mechanical and chemical properties. In addition, these blends may be weld bonded to polyolefin substrates, typically polypropylene compounds or fabrications, more readily than the styrenic block copolymer alone. This improved bonding is believed to be due to better processing, as well as similarity of the composition of the polypropylene substrate and the blend of this invention. Moreover, the polymeric compositions of this invention are soft and elastic yet have improved flow properties at processing temperatures that are better than those displayed by previous materials.

SUMMARY OF THE INVENTION

This invention relates to a polymeric composition having an MFR of at least 50 dg/min and a flexural modulus less than 100 MPa, comprising:

(i) from about 1 to about 99 wt. %, based on the total weight of hydrocarbons in the polymeric composition, of a propylene polymer component (referred to as PDC or PPC) comprising at least one propylene copolymer comprising from 99.9 to 65 wt. % propylene and 0.1 to 35 wt. % comonomer (based upon the weight of the copolymer), wherein the propylene copolymer has an MFR (melt flow rate as measured by ASTM 1238, at 230° C. and 2.16 kg) from 250 to 7500 dg/min, an annealed heat of fusion between 0.5 and 40 J/g, and an mm triad tacticity index of at least 75%; and (ii) blended therewith, from about 99 to about 1 wt. %, based on the total weight of hydrocarbons in the polymeric composition, of a styrenic block copolymer component (referred to as SBC component or SBCC) comprising at least one elastomeric styrenic block copolymer.

DETAILED DESCRIPTION OF THE INVENTION

Definitions

Figure 1:
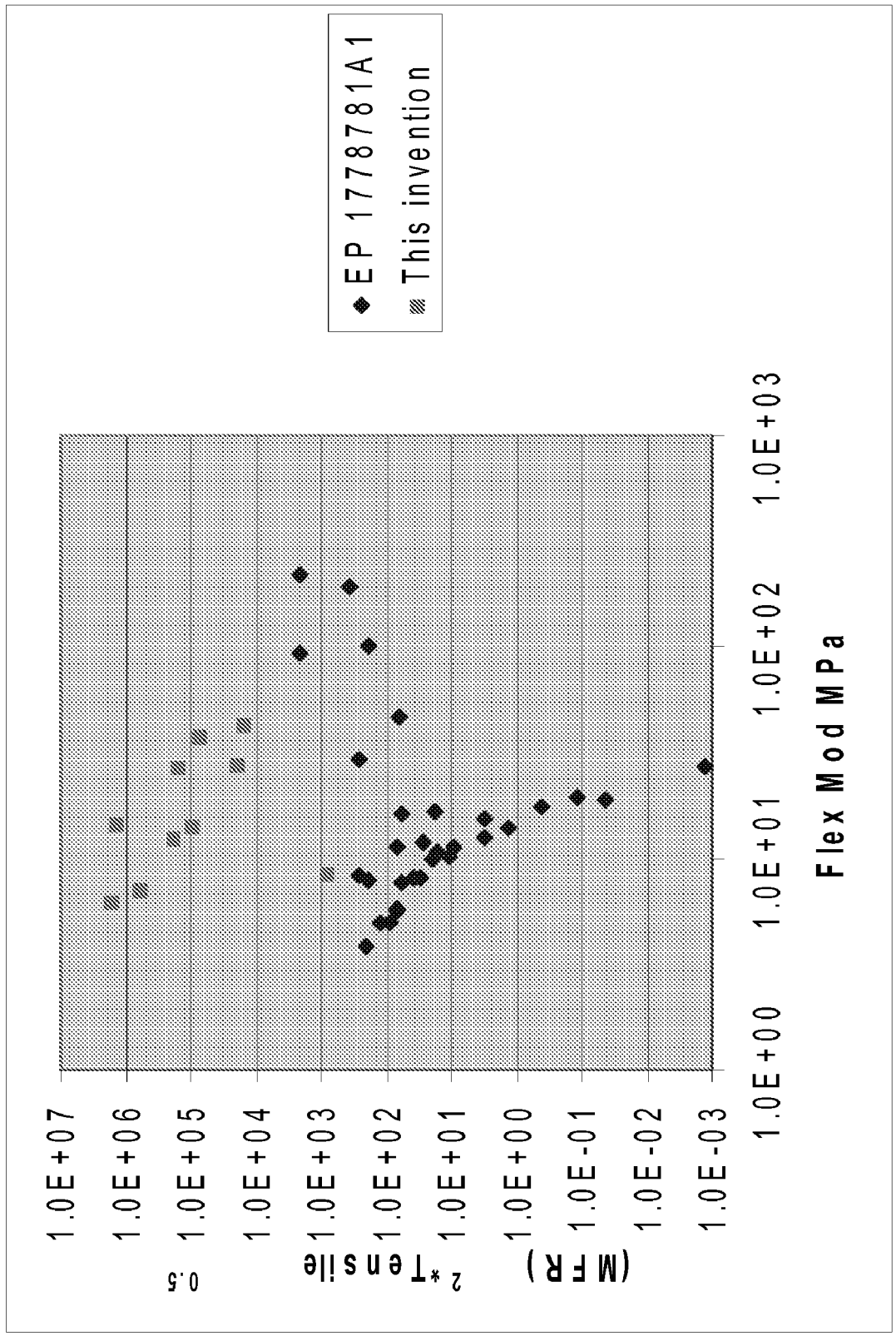
FIG. 1 plots the MTN (defined above) versus the flexural modulus, for inventive compositions according to embodiments of the present invention, contrasted with the same data for compositions reported in US 2007/0240605.

As used herein: MW is molecular weight, Mw is weight average molecular weight, Mn is number average molecular weight, and Mz is z average molecular weight. MFR is melt flow rate (as measured by ASTM 1238,-04C at 230° C. and 2.16 kg, units are dg/min). Hf (also referred to as ΔHf) is heat of fusion. An annealed heat of fusion is Hf measured after the sample has been annealed for 5 minutes at 100° C. wt. % is weight percent. DSC is differential scanning calorimetry and DMTA is dynamic mechanical thermal analysis. Tm is the melting point of the composition in ° C. as determined by DSC. Tg is the glass transition temperature of the composition in ° C. as determined by DMTA. "mm" is an mm triad tacticity index as determined by carbon-13 nuclear magnetic resonance ($^{13}$C NMR, as described at paragraph [0239] to [0240] of US 2006/0247331). Shore A hardness is measured instantaneously according to ASTM D 2240. Tensile strength and Ultimate elongation are measured according to ASTM D790 on Type 3 samples deformed at a rate of 20 inches (50.8 cm)/minute. Tensile strength is reported in MPa and Ultimate elongation in %. 300% modulus is the tensile strength of the sample at an elongation of 300%. 500% modulus is the tensile strength of the sample at an elongation of 500%.

When a polymer or oligomer is referred to as comprising an olefin, the olefin present in the polymer or oligomer is the polymerized or oligomerized form of the olefin. An oligomer is defined to be compositions having 2-120 monomer units. A polymer is defined to be compositions having 121 or more monomer units.

Unless otherwise noted, all molecular weight units (e.g., Mw, Mn, Mz) are g/mol and all ppm's are wt. ppm. Unless otherwise noted all melting points ($T_m$) for the PDC is from the first melt and for all of the other polymers and their blends described in this invention, from the second melt. Hf is determined using the area under the Tm curve.

The term styrenic block copolymer (SBC) means a block copolymer of styrene and or alpha-methyl-styrene and an olefin such as an alpha olefin (ethylene, propylene, butene) or an alkadiene (isobutylene, isoprene, butadiene) and hydrogenated or chemically modified versions of the block copolymer. The block copolymers may be in diblock, triblock, linear (including tapered) or radial (including tapered) block form.

The terms "elastomeric styrenic block copolymer," "SBC elastomer," and "SBC rubber" mean a styrenic block copolymer with an elongation at break of at least 500% and a tensile strength of at least 6 MPa measured according to ASTM D412. This definition specifically includes styrenic block copolymer rubbers such as SEBS, SEPS, SIS, SBS, SIBS and the like (for example, radial block copolymers), where S=styrene, EB=random ethylene+butene, EP=random ethylene+propylene, I=isoprene, and B=butadiene). Preferred SBC elastomers have a Shore A hardness (10-sec value) between about 23 to about 87. Preferred SBC elastomers may have a $T_m$ of 100° C. or less.

A propylene polymer is a homopolymer or copolymer having at least 50 mole % propylene. A propylene copolymer is a copolymer having at least 50 mole % propylene at least 0.1 mole % of at least one other comonomer.

This invention relates to polymeric compositions that have processability characteristics enabling the compositions to be used in a variety of product forms while having beneficial physical properties such as tensile strength, toughness and elastic properties. For example, in one embodiment, the polymeric compositions demonstrate good processability in traditional processes like extrusion, injection molding, blow molding, compression molding, rotational molding, calendaring, etc., while exhibiting softness, good tensile strength, and low tension set and hysteresis. The combination of processability and physical properties makes the polymeric compositions useful in a variety of applications such as films, fibers, woven and non-woven fabrics, sheets, molded objects, extruded forms, thermoformed objects, and all products made from such application materials.

In a preferred embodiment, this invention relates to (1) a low molecular weight PDC comprising propylene copolymer having a low crystallinity at modest levels of α-olefin used to prepare and process polymer compositions, and (2) polymeric compositions comprising a soft, plasticized, homogeneous high flow blend of the PDC with a styrenic block copolymer (SBC). In one embodiment, the blend composition can be heterogeneous, and in another embodiment, homogeneous.

In a preferred embodiment, this invention relates to a polymeric composition having an MFR of at least 50 dg/min and a flexural modulus less than 100 MPa comprising:

(i) from about 1 to about 99 wt. %, based on the total weight of hydrocarbons in the polymeric composition, of a propylene polymer component (PDC) comprising (preferably consisting essentially of) at least one propylene copolymer comprising from 95 to 75 wt. % propylene (preferably 92 to 80 wt. %, more preferably 90 to 80 wt. %) and 5 to 25 wt. % comonomer (preferably 8 to 20 wt. %, more preferably 10 to 20 wt. %) based upon the weight of the copolymer, wherein the propylene copolymer has an MFR from 250 to 7500 dg/min, an annealed Hf between 0.5 and 40 J/g, and an mm triad tacticity index of at least 75%; and (ii) blended therewith, from about 99 to about 1 wt. %, based on the total weight of hydrocarbons in the polymeric composition, of a styrenic block copolymer (SBC) component comprising at least one elastomeric styrenic block copolymer.

In another preferred embodiment, this invention relates to a polymeric composition comprising a blend of: (a) a blend of a propylene copolymer (as defined here in) and a polyolefin polymer having a $T_m$ above 100° C. (such as isotactic polypropylene) and (b) an SBC or a blend of an SBC with another polyolefin having a melting point of more than 100° C. (such as propylene homopolymers, random propylene copolymers and propylene-styrene block copolymers). In another embodiment the blend comprises a propylene copolymer and a blend of an SBC with another polyolefin having a melting point of more than 110° C. (such as propylene homopolymers, random propylene copolymers and propylene-styrene block copolymers).

Polymeric Composition Properties and Proportions

In a preferred embodiment, the PDC is present at from 5 to 50 wt. % (preferably 10 to 45 wt. %) and the SBC component is present at from 95 to 50 wt. % (preferably 90 to 55 wt. %), based upon the weight of the hydrocarbon components of the polymeric composition.

The polymeric composition can further contain from about 1 to about 98 wt. % (based upon the weight of the hydrocarbon components of the polymeric composition) of a tertiary polymer component (TPC) having a melting point greater than about 110° C. and selected from the group consisting of propylene homopolymers, random propylene copolymers and propylene-styrene block copolymers. The TPC are preferably selected from the group consisting of isotactic polypropylene, and random copolymers of at least 90 wt. % propylene and up to 10 wt. % α-olefin comonomers (such as ethylene), based upon the weight of the TPC.

In a preferred embodiment the TPC is present at 1 to 65 wt. %, preferably 5 to 50 wt. % and even more preferably from 10 to 30 wt. %.

Often commercial SBC's are sold as blends with polyolefins, such as polypropylene. For purposes of this invention, any such polyolefin is considered a TPC. Likewise, propylene copolymers useful herein may also be sold commercially as blend with other polyolefins (such as isotactic polypropylene). For purposes of this invention any such polyolefin is considered a TPC.

In another embodiment, the polymeric composition can also include from 2 to 200 parts by weight of a plasticizer per hundred parts by weight of total polymer. Alternately the polymeric composition can contain form 0.5 to 5 wt. % plasticizer, based upon the weight of the polymeric composition.

Often commercial SBC's are sold as blends with process oils, such as hydrocarbon fluids. For purposes of this invention, any such blend is considered a SBC component diluted with a process oil which is a plasticizer.

In a preferred embodiment, the polymeric compositions described herein have an MFR of at least 0.5 dg/min (preferably at least 2 dg/min, preferably at least 5 dg/min and even more preferably 20 dg/min and yet more preferably more than 50 dg/min) and a flexural modulus less than 100 MPa (preferably at most 80 MPa, preferably at most 40 MPa, preferably at most 20 MPa and even more preferably at most 10 MPa). Flexural modulus is measured in accordance with ASTM D790, using a Type IV dogbone specimen at a crosshead speed of 1.3 mm/min (0.05 in/min).

In another embodiment, the polymeric compositions described herein have a Shore A hardness (ASTM 2240, 10 second) of at most 95, preferably at most 80, preferably at most 60, preferably at most 40 and even more preferably at most 20.

In another embodiment, the polymeric compositions described herein have a tensile strength (ASTM D638, modified as noted in Example section below) of less than 40 MPa, preferably less than 20 MPa, preferably less than 12 MPa and preferably less than 5 and preferably less than 2 MPa.

In another embodiment, the polymeric compositions described herein have a Ultimate Elongation (ASTM D638, modified as noted in Example section below) of greater than 200%, preferably greater than 500%, preferably greater than 800% and preferably greater than 1200% and even more preferably greater than 2000%.

In another embodiment, the polymeric compositions described herein have a 300% Modulus (ASTM D638, modified as noted in Example section below) of less than 14 MPa, preferably less than 10 MPa, preferably less than 4 MPa and preferably less than 1 MPa.

In another embodiment, the present invention relates to blends of SBC and PDC, which are malleable and processable as defined by an MFR of at least 0.5 dg/min (preferably at least 2 dg/min, preferably at least 5 dg/min and even more preferably 20 dg/min and yet more preferably more than 50 dg/min). In another embodiment, the present invention also relates to blends of SBC, TPC and PDC, which are malleable and processable as defined by an MFR of at least 0.5 dg/min (preferably at least 2 dg/min, preferably at least 5 dg/min and even more preferably 20 dg/min and yet more preferably more than 50 dg/min).

In a preferred embodiment, the SBC component (or blend of two or more SBC's that make up the SBC component) has an MFR of from 0.1 to 150 dg/min. Preferred SBC's have an elongation at break of at least 500% and a tensile strength of at least 6 MPa measured according to ASTM D412. Preferably the SBC component has a Shore A hardness (10-sec value) between about 23 to about 87 and/or a $T_m$ of 100° C. or less. They can be a linear triblock copolymer or a radial block copolymer. Optionally each of the above polymers can contain a diblock copolymer.

Preferred SBC polymers have a dual morphology of hard and soft, chemically connected segments, separated in domains of less than 1 micrometer. The thermal properties of each phase is retained in the final SBC, thus the hard and soft segments retain their Tm and Tg. This implies that in SBC polymer components there can be at most two distinct Tg and two distinct Tm. SBC polymer components are characterized by exceptionally high elongations and strengths much like thermoset or vulcanized rubbers even though SBC polymers are, in theory at least, always melt processable.

In another embodiment, the polymeric composition can have an MFR-tensile number greater than 2500 (preferably greater than 3000, preferably greater than 3500) according to the equation: $MTN=(MFR)^2(M)^{1/2}$; wherein MTN is the MFR-tensile number, MFR is the melt flow rate of the polymeric composition in dg/min and M is the tensile modulus at break according to ASTM D638 at 50.8 cm/min (20 in/min) in MPa.

In another embodiment, the MFR of the inventive blend made comprising the SBC component and PDC (also referred to as the PDC-Blend) is greater than that of a comparative blend (Comp-blend) made with the same ingredients except that the PDC is absent and a process oil* is substituted at the same wt. % for the PDC. Preferably the MFR of the PDC-blend is 200% greater than the MFR of the Comp-blend, preferably 500% greater, preferably 700% greater, preferably 1500% greater. *For purpose of this comparison the process oil is a Group II basestock oil (as defined by Rudnick and Shubkin in *Synthetic Lubricants and High-Performance Functional Fluids*, Second edition (Marcel Dekker, Inc. New York, 1999) having a $KV_{100}$ of 11 cSt, a Viscosity Index of 97, a pour point of −9° C., a specific gravity of 0.881, and a flash point of 228° C., (such as Sunpar 150, available from Sunoco.) Kinematic Viscosity at 100° C. ($KV_{100}$) is determined by ASTM D445, viscosity index (VI) is determined by ASTM D2270, pour point is determined by ASTM D97, specific gravity is determined by ASTM D4052 (15.6/15.6° C.), and flash point is determined by ASTM D92.

In embodiments, the blend compositions described herein can have an MFR of at least 50, at least 100, at least 200, at least 300, at least 400 or at least 500 dg/min.

In another embodiment blends made with SBC and PDC, wherein the SBC comprises styrene-ethylene/butylene-styrene block copolymer (SEBS), are soft, malleable and easily processed. In contrast, similar blends where the PDC is replaced with process oils are powdery and granular.

In another embodiment, the blend compositions described herein can have a flexural modulus determined as 1% secant according to ASTM D790-0310618-05 (FM) from a lower limit of 1, 2, or 5 to an upper limit of 100, 75, 50, 40, 30 or 25 MPa. In another embodiment, the blend composition can have an MFR-tensile number (MTN) greater than 2500, 5000, 7000, 10,000, 30,000 or 50,000 $(dg/min)^2-(MPa)^{1/2}$, wherein the MTN is defined herein as follows: $MTN=(MFR)^{2'}(M)^{1/2}$ wherein MFR is the melt flow rate of the composition in dg/min and M is the tensile modulus at break according to ASTM D638 at 50.8 cm/min (20 in/min) in MPa.

In a preferred embodiment, the PDC comprises from 25% to 35% by weight of the hydrocarbon components of the blend, the SBC component comprises from 30% to 50% by weight of the hydrocarbon components of the blend, with the balance of the hydrocarbon components of the blend comprising process oil. In another embodiment, the preferred blend also contains from 10 to 20% of inorganic filler by total weight of the hydrocarbon components of the blend.

Propylene Polymer Component

In a preferred embodiment, the propylene copolymer of the PDC comprises 0.1 to 35 wt. % (preferably 5 to 25 wt. %, preferably 8 to 20 wt. %, more preferably 10 to 20 wt. %) of one or more comonomers selected from the group consisting of ethylene and C4 to C20 olefins, preferably ethylene, butene, hexene, octene, decene, and dodecene, more preferably ethylene butene and hexene, preferably ethylene). The propylene copolymer may also include from about 0.5 to about 3 wt. % diene (based upon the weight of the copolymer). In a preferred embodiment the comonomer comprises ethylene and one or more of butene, hexene and octene.

The PDC may comprise one, two, three or more different propylene copolymers (by different is meant that the copolymers differ in comonomer choice; or in at least one of Mw, Mz, Mn, $T_m$, comonomer content, Hf, Mw/Mn, 2,1 insertions, 3,1 insertions, tensile modulus by at least 10%, preferably at least 40%, preferably at least 100% and preferably at least 500%.

Preferably, the propylene copolymer (or blend of propylene copolymers that make up the PDC) has: (1) a melting point between 25° C. and 110° C.; and/or (2) a heat of fusion from 1.0 to 125 J/g; and/or (3) a propylene tacticity index (m/r) from 4 to 12; and/or (4) a reactivity ratio product $r_1r_2$ of less than 1.5; and/or (5) a molecular weight distribution (Mw/Mn) between 1.5 and 40, and/or (6) an elasticity in % equal to or less than 0.935M+12 where M is the 500% tensile modulus in MPa and is at least 0.5 MPa; and/or (7) a proportion of inversely inserted propylene units greater than 0.5%, based on 2.1 insertion of propylene monomer in all propylene insertions; and/or (8) a proportion of inversely inserted propylene units greater than 0.05%, based on 1.3 insertion of propylene monomer in all propylene insertions; and/or (9) less than 10,000 ppm by weight of the copolymer of a molecular degradation agent (such as peroxide) or its reaction products.

Preferred propylene copolymers are typically made in one or more steady-state reactors in the presence of a bridged metallocene catalyst.

In an embodiment the PDC comprises a low molecular weight (MFR of 250-7500 dg/min) propylene α-olefin copolymer for blending with styrene block polymers which has some or all of the following features: (1) a Tm (as measured by the DSC method in the Example section below) between an upper limit of less than 110° C., 90° C., 80° C., or 70° C., and a lower limit of greater than 25° C., 35° C., 40° C., or 45° C.; (2) an mm triad tacticity index as determined by carbon-13 nuclear magnetic resonance ($^{13}C$ NMR, as described at paragraph [0239] to [0240] of US 2006/0247331) of greater than 75%, 80%, 85%, or 90%; (3) a relationship of elasticity to 500% tensile modulus such that elasticity in % is less than or equal to 0.935M+12, 0.935M+6, or 0.935M, where M is the 500% tensile modulus in MPa (where elasticity and 500% tensile modulus are determined according ASTM D 638, modified as noted in Example section below); (4) a heat of fusion ranging from a lower limit of greater than 1.0, 1.5, 4.0, 6.0, or 7:0 joules per gram (J/g), to an upper limit of less than 125, 100, 75, 60, 50, 40, or 30 J/g (as measured by the DSC method in the Example section below); (5) a propylene tacticity index (m/r), determined as described at paragraph [0237] of US 2006/0247331, ranging from a lower limit of 4 or 6 to an upper limit of 8, 10 or 12; (6) a proportion of inversely inserted propylene units based on 2.1 insertion of propylene monomer in all propylene insertions, as measured by $^{13}C$ NMR, of greater than 0.5% or 0.6%; (7) a proportion of inversely inserted propylene units based on 1.3 insertion of propylene monomer in all propylene insertions, as measured by $^{13}C$ NMR, of greater than 0.05%, 0.06%, 0.07%, 0.08%, or 0.085%, which is determined according to the procedure described in U.S. Pat. No. 5,504,172, which describes this βγ peak and understands it to represent a sequence of four methylene units; (9) a reactivity ratio product $r_1r_2$ (as described in *Textbook of Polymer Chemistry*, F. W. Billmeyer, Jr., Interscience Publishers, New York, p. 221 et seq. (1957)) of less than 1.5, 1.3, 1.0 or 0.8; (10) an Mw/Mn ranging from a lower limit of 1.5 or 1.8 to an upper limit of 40, 20, 10, 5 or 3; Mw, Mn and Mz are determined according to Sun et al., *Macromolecules, vol.* 34, no. 19, pp. 6812-6820 (2001). (11) an MFR of greater than 250, 300, 400, 500, 600, 750, 1000, 1300, 1600, or 2000 and less than 7500, 6500, 5500, 4500, 3000 or 2500; (12) a 500% tensile modulus of greater than 0.5, 0.8, 1.0, or 2.0 MPa (determined according ASTM D 638, modified as noted in Example section below); (13) a heat of fusion of less than 40, 35, 25, 20, 15, 10, 6, or 3 J/g and more than 0.5, 1 or 2 J/g (determined according to DSC method in the example section below); (14) the copolymer contains less than 10000, 5000, 3000, 2000, 1000, 500, or 250 ppm by weight of the copolymer of a molecular degradation agent or its reaction products; and/or (15) the copolymer is made by reacting a mixture of monomers including α-olefins and propylene in one or more steady-state reactors under reactive conditions in the presence of a bridged metallocene catalyst.

The mm triad tacticity index (mm fraction) of a propylene copolymer can be determined from a $^{13}C$ NMR spectrum of the propylene copolymer as described in U.S. Pat. No. 5,504, 172. The spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum can be assigned with reference to *Polymer*, Volume 30, page 1350 (1989). The calculation of the triad tacticity index is outlined in the techniques shown in U.S. Pat. No. 5,504,172 and in US 2006/0247331 (page 18, paragraph [239]-[240]). The propylene copolymers useful herein typically have an mm triad tacticity index of three propylene units, as measured by $^{13}C$ NMR, of greater than 75%, 80%, 82%, 85%, or 90%.

Propylene tacticity index (m/r) is determined using Carbon 13 NMR and is described at US 2006/0247331, page 18, paragraph [237].

The insertion of propylene can occur to a small extent by either 2.1 (tail to tail) or 1.3 insertions (end to end), as known in the art. The proportion of the 2,1-insertions to all of the propylene insertions in a propylene copolymer can be calculated by reference to article in the journal *Polymer*, vol. 30, p. 1350 (1989), using the peak-naming method of Carman, et al., *Rubber Chemistry and Technology*, vol. 44, p. 781 (1971), also see K. Soga, *Macromolecular Chemistry Rapid Communication*, vol. 8, p. 305 (1987), and where necessary to separate the peak areas of the Iαβ structures, substituting carbon peaks having the corresponding areas as is known in the art.

The measurement of the 1.3 insertion requires the measurement of the βγ peak. Two structures can contribute to the βγ peak: (1) a 1.3 insertion of a propylene monomer; and (2) from a 2,1-insertion of a propylene monomer followed by two ethylene monomers. This peak is described as the 1.3 insertion peak and we use the procedure described in U.S. Pat. No. 5,504,172, which describes this βγ peak and understand it to represent a sequence of four methylene units. The proportion (%) of the amount of these errors was determined by dividing the area of the βγ peak (resonance in the vicinity of 27.4 ppm) by the sum of all the methyl group peaks and ½ of the area of the β γ peak, and then multiplying the resulting value by 100. If an α-olefin of three or more carbon atoms is polymerized using an olefin polymerization catalyst, a number of inversely inserted monomer units are present in the molecules of the resultant olefin polymer. In polyolefins prepared by polymerization of α-olefins of three or more carbon atoms in the presence of a chiral metallocene catalyst, 2,1-insertion or 1,3-insertion takes place in addition to the usual 1,2-insertion, such that inversely inserted units such as a 2,1-insertion or a 1,3-insertion are formed in the olefin polymer molecule (see, *Macromolecular Chemistry Rapid Communication*, Volume 8, page 305 (1987), by K. Soga, T. Shiono, S. Takemura and W. Kaminski).

The propylene copolymer (PDC) component of the polymer blend compositions of the present invention preferably comprises a crystallizable copolymer of propylene and ethylene and, optionally, another α-olefin. A crystallizable polymer, distinct from a crystalline polymer, is defined herein as a polymeric component where the measured crystallinity of the polymer as measured by the heat of fusion by differential scanning calorimetry (DSC) is augmented after conditioning by a factor of at least 1.5, or at least 2. Conditioning for crystallizable polymer determination can include (1) waiting for a period of 120 hours at room temperature, or (2) single or repeated mechanical distension of the sample.

The PDC can include total propylene-derived units from a lower limit of 65 or 70% by weight of the PDC to an upper limit of 95, 94, 92, or 90% by weight of the PDC, and ethylene and other α-olefin-derived units from a lower limit of 5, 6, 8, or 10% by weight of the PDC to an upper limit of 20, 25, 30 or 35% by weight of the PDC. Suitable α-olefins other than ethylene or propylene have from 4 to about 20 carbon atoms. These copolymers are mildly crystalline (less than 20%, preferably less than 10%) as determined by DSC, and are exceptionally soft, while still retaining substantial tensile strength and elasticity. (% crystallinity of a propylene polymer is determined by the following formula: % X=(Hf j/g)/(189 J/g)×100), where % X is % crystallinity, and Hf is the heat of fusion of the sample in question in J/g. The PDC useful in the present invention exhibits the softness, tensile strength and elasticity characteristic of vulcanized rubbers, without the need for vulcanization.

The PDC may in embodiments also include diene-derived units preferably in an amount greater than 0.1, 0.5 or 1% by weight of the PDC. Diolefins, preferably nonconjugated diolefins, may be incorporated in the PDC to facilitate chemical crosslinking reactions. Sources of diene can include diene added to the monomers in the polymerization, or use of diene in the polymerization catalysts. For example, conjugated diene-containing metallocene catalysts have been suggested for the formation of copolymers of olefins, and polymers made from such catalysts may incorporate the diene from the catalyst in the polymerization of other monomers.

The PDC of the present invention preferably comprises a random copolymer having a narrow crystallinity distribution. The intermolecular compositional distribution of the polymer can be determined by thermal fractionation of a sample of the PDC in excess solvent, typically a saturated hydrocarbon such as hexane or heptane at 50° C.

The length and distribution of stereoregular propylene (PP) sequences in the PDC propylene copolymer are consistent with substantially random statistical copolymerization. These are described more fully in *Textbook of Polymer Chemistry*, F. W. Billmeyer, Jr., Interscience Publishers, New York, p. 221 et seq. (1957). Carbon 13 nuclear magnetic resonance spectroscopy ($^{13}$C NMR) is used to determine diad and triad distribution via the integration of spectral peaks. A substantially random copolymer is one for which the reactivity ratio product $r_1 r_2$ is between 0.6 and 1.5. The PDC in embodiments herein has a reactivity ratio product $r_1 r_2$ of less than 1.5, 1.3, 1.0, or 0.8. To produce the PDC with the required randomness and narrow composition distribution, it is desirable to use a single sited catalyst in a well-mixed, continuous flow stirred tank polymerization reactor which allows a uniform polymerization environment for growth of substantially all of the polymer chains.

The PDC preferably has stereoregular propylene sequences long enough to crystallize. These stereoregular propylene sequences may match the stereoregularity of the propylene sequences in another polypropylene blend component (e.g. the TPC). It is believed that matching of the stereoregularity increases the compatibility of the components and results in improved solubility and compatibility of the polymers of different crystallinities in the polymer blend.

Stereoregularity of the propylene sequences in the PDC can preferably be achieved by polymerization with a chiral metallocene catalyst, and more preferably in an embodiment where the polymerization catalyst forms essentially or substantially isotactic polypropylene. Measurements of the tacticity are determined by $^{13}$C NMR as described in US 2007/0244276A1. The PDC in various embodiments have a triad tacticity of greater than 75, 80, 82, 85, or 90% of the total propylene triad units.

As is well known, the insertion of propylene can occur to a small extent by either 2.1 (tail to tail) or 1.3 insertions (end to end). Measurements of the insertion geometry are determined by 13C NMR as described in US 2007/0244276A1. As measured by $^{13}$C NMR, the proportion of inversely inserted propylene units of embodiments of the present PC, based on the 2,1-insertion of propylene monomer, is greater than 0.5 or 0.6%; and based on the 1,3-insertion of propylene monomer, is greater than 0.05, 0.06, 0.07, 0.08, or 0.085%.

Homogeneous distribution is defined herein as a statistically insignificant intermolecular difference in both the monomer composition of the copolymer and the tacticity of the propylene units, i.e., a copolymer having a homogeneous distribution will meet the requirement of two independent tests: (1) intermolecular distribution of tacticity; and (2) intermolecular distribution of composition.

In preferred embodiments, the PDC has a single melting point as determined by DSC, between an upper limit of less than 110° C., 90° C., 80° C., or 70° C., and a lower limit of greater than 25° C., 35° C., 40° C., or 45° C. Generally, the PDC of the present invention has a melting point between about 90° C. and 20° C. Preferably, the melting point is between about 75° C. and 25° C. In embodiments, the PDC component also has a heat of fusion ranging from a lower limit of greater than 1.0, 1.5, 4.0, 6.0, or 7.0 J/g, to an upper limit of less than 125, 100, 75, 60, 50, 40 or 30 J/g. Without wishing to be bound by theory, we believe that embodiments of the PDC have generally isotactic crystallizable propylene sequences, and these heats of fusion are believed to be due to the melting of these crystalline segments.

Molecular weight distribution (MWD), sometimes also called the polydispersity index (PDI), is a measure of the range of molecular weights (Mw/Mn) within a given polymer sample. The MWD can be measured using gel permeation chromatography (GPC), also known as size exclusion chromatography (SEC), for example, using chromatograph equipped with ultrastyro gel columns operated at 145° C. with trichlorobenzene as the elution solvent according to procedures well known in the art. See for example, Slade, *Polymer Molecular Weights Part II*, Marcel Dekker, Inc., NY, 287-368 (1975); Rodriguez, *Principles of Polymer Systems* 3rd ed., Hemisphere Pub. Corp., NY, 155-160 (1989); U.S. Pat. No. 4,540,753; Verstrate, *Macromolecules*, vol. 21, 3360 (1988); and references cited therein.

In embodiments of the invention, the PDC can have Mw of from 10,000 to 500,000, or from 20,000 to 200,000, and an Mw/Mn from a lower limit of at least 1.5 or 1.8 to an upper limit of less than 40, 20, 10, 5 or 3.

In embodiments, the PDC can have an MFR (230° C., 2.16 kg) from a lower limit of greater than 250, 300, 400, 500, 600, 750, 1000, 1300, 1600, or 2000 dg/min, to an upper limit of less than 7500, 6500, 5500, 4500, 3000 or 2500 dg/min.

In embodiments, the PDC can have an elongation of greater than 500%, 600%, or 900%; and a tensile strength greater than 2.1, 3.5 or 6.9 MPa (300, 500 or 1000 psi). Tensile and elongation properties are determined at 51 cm/min (20 in/min) according to the procedure described in ASTM D790. The data are reported in engineering units with no correction to the stress for the lateral contraction in the specimen due to tensile elongation. The tensile and elongation properties of embodiments are evaluated using dumbbell-shaped samples which are compression molded at 180° C. to 200° C. for 15 minutes at a force of 133 kN (15 tons) into a plaque of dimensions of 15 cm by 15 cm (6 in. by 6 in.). The cooled plaques are removed and the specimens are removed with a die.

Preferably the polymeric blend compositions described herein are elastic after tensile deformation. The inverse of elasticity (or tension set) can be represented by the fractional increase in the length of the sample measured according to the general procedure of ASTM D790. During tensile elongation, the sample is stretched, and the polymer attempts to recover its original dimensions when the stretching force is removed. This recovery is not complete, and the final length of the relaxed sample is usually longer than that of the original sample. The inverse of elasticity (or tension set) is represented by the fractional increase in the length of the sample, expressed as a % of the length of the original un-stretched sample.

The tension set of a sample is determined by pre-stretching the deformable zone of the dumbbell, made according to the procedure described above for the measurement of elongation and tensile strength, which is the narrow portion of the specimen, to 200% of its original length to pre-stretch the sample. This is conducted at a deformation rate of 25 cm per minute (10 in/min). The sample is relaxed at the same rate to form an analytical specimen which is a pre-stretched specimen of the original sample. This slightly oriented, or pre-stretched, sample is allowed to relax for 48 hours, at room temperature, prior to the determination of elasticity. The length of the deformation zone in the sample $d_1$ is measured, and after the 48 hours, it is again deformed at 25 cm/min for a 200% extension of the deformation zone of the sample and allowed to relax at the same rate. The sample is removed and after 10 minutes of relaxation, the sample is measured to have a new length of the deformation zone $d_2$. The tension set of the sample in % is calculated as $100*(d_2-d_1)/d_1$.

In another embodiment, the PDC contains less than 10,000, 5000, 3000, 2000, 1000, 500 or 250 ppm by weight of the PDC of a molecular degradation agent or its reaction products. PC's of the viscosities and the molecular weights disclosed herein are preferably made by polymerization directly to the desired viscosity and molecular weight rather than by molecular degradation of the higher viscosity, higher molecular PC analogs using chain scission agents, e.g. peroxides at temperatures between 150° C. to 270° C.

Process to Make PDC

The propylene copolymers can be prepared in a single stage, steady state polymerization process conducted in a well-mixed continuous feed polymerization reactor. The polymerization can be conducted in solution, although other polymerization procedures such as gas phase or slurry polymerization, which fulfill the requirements of single stage polymerization and continuous feed reactors, are may also be used. The continuous, non-batch process, in steady state operation, is exemplified by removal of amounts of polymer made per unit time, being substantially equal to the amount of polymer withdrawn from the reaction vessel per unit time. By "substantially equal" we intend that these amounts, polymer made per unit time, and polymer withdrawn per unit time, are in ratios of one to other, of from 0.9:1; or 0.95:1; or 0.97:1; or 1:1.

The propylene copolymers can be prepared by polymerizing a mixture of propylene and one or more other alpha olefins in the presence of a chiral catalyst (preferably a chiral metallocene), wherein a copolymer is obtained comprising up to 35% by weight ethylene and/or higher alpha olefin and preferably up to 20% by weight ethylene and/or higher alpha olefin containing isotactically crystallizable propylene sequences, in a single stage or multiple stage reactor. Generally, without limiting in any way the scope of the invention, one process for the production of the PC is as follows: (1) liquid propylene is introduced in a stirred-tank reactor which is completely or partly full of liquid comprising the solvent, the propylene copolymers as well as dissolved, unreacted monomer(s) and catalyst components, (2) the catalyst system is introduced via nozzles in either the vapor or liquid phase, (3) feed ethylene gas and any higher α-olefins are introduced either into the vapor phase of the reactor, or sparged into the liquid phase as is well known in the art, (4) the reactor contains a liquid phase composed substantially of propylene, together with dissolved ethylene and/or higher alpha olefin, and a vapor phase containing vapors of all monomers, (5) the reactor temperature and pressure may be controlled via reflux of vaporizing propylene (autorefrigeration), as well as by cooling coils, jackets, etc., (6) the polymerization rate is controlled by the concentration of catalyst, temperature, and (7) the ethylene and/or higher alpha olefin content of the polymer product is determined by the ratio of ethylene and/or higher alpha olefin to propylene in the reactor, which is controlled by manipulating the relative feed rates of these components to the reactor. According to another embodiment, the PDC may contain small quantities of a non-conjugated diene, which can be added to the reactor with the other monomer feeds.

A typical polymerization process consists of a polymerization in the presence of a catalyst comprising a chiral bis (cyclopentadienyl) group 4 metal compound and either: 1) a non-coordinating compatible anion activator or 2) an alumoxane activator. An exemplary catalyst system is described in U.S. Pat. No. 5,198,401. The alumoxane activator is preferably utilized in an amount to provide a molar aluminum to metallocene ratio of from about 1:1 to about 20,000:1 or more. The non-coordinating compatible anion activator is preferably utilized in an amount to provide a molar ratio of biscyclopentadienyl metal compound to non-coordinating anion of 10:1 to about 2:3. The above polymerization reaction is conducted by reacting such monomers in the presence of such catalyst system at a temperature of from about −50° C. to about 200° C. for a time of from about 1 second to about 10 hours to produce a copolymer or terpolymers having an MFR between 250 g/10 min and 7500 g/10 min and a Mw/Mn from greater than 1 to about 6, preferably from about 1.8 to about 4.5.

While the process of the present invention includes utilizing a catalyst system in the liquid phase, e.g. slurry, solution, suspension or bulk phase or combination thereof, gas phase polymerization can also be utilized. When utilized in a gas phase, slurry phase or suspension phase polymerization, the catalyst systems will preferably be supported catalyst systems as described in U.S. Pat. No. 5,057,475, for example, and can also include other well-known additives such as, for example, scavengers as described in U.S. Pat. No. 5,153,157.

Descriptions of useful ionic catalysts for polymerization herein including metallocene cations activated by non-coordinating anions appear U.S. Pat. Nos. 5,198,401 and 5,278,119, and WO 92/00333. These references suggest a method of preparation wherein metallocenes (bis Cp and mono Cp) are protonated by anionic precursors such that an alkyl/hydride group is abstracted from a transition metal to make it both cationic and charge-balanced by the non-coordinating anion. The use of ionizing ionic compounds not containing an active proton but capable of producing both the active metallocene cation and a non-coordinating anion are also useful herein. See, EP 0426637, EP 0573403 and U.S. Pat. No. 5,387,568. Reactive cations other than Bronsted acids capable of ionizing the metallocene compounds include ferrocenium, triphenylcarbonium, and triethylsilylium cations. Any metal or metalloid capable of forming a coordination complex which is resistant to degradation by water (or other Bronsted or Lewis acids) may be used or contained in the anion of the second activator compound. Suitable metals include, but are not limited to, aluminum, gold, platinum and the like. Suitable metalloids include, but are not limited to, boron, phosphorus, silicon and the like.

An additional method of making the ionic catalysts uses ionizing anionic pre-cursors which are initially neutral Lewis acids but form the cation and anion upon ionizing reaction with the metallocene compounds. For example tris (pentafluorophenyl) boron acts to abstract an alkyl, hydride or silyl ligand to yield a metallocene cation and stabilizing non-coordinating anion; see EP 0427697 and EP 0520732. Ionic catalysts useful herein for addition polymerization can also be prepared by oxidation of the metal centers of transition metal compounds by anionic precursors containing metallic oxidizing groups along with the anion groups; see EP 0495375. Catalyst combinations are described in US 2007/0244276A1.

According to another embodiment, the invention is directed to a process for preparing blend compositions comprising the steps of: (a) polymerizing a mixture of ethylene and propylene in the presence of a chiral metallocene catalyst to obtain a copolymer comprising from about 65% to about 95% propylene by weight of the copolymer having an mm triad tacticity index of at least 75% and an MFR greater than 250 dg/min; (b) polymerizing propylene or a mixture of propylene and one or more monomers selected from ethylene or $C_4$-$C_{20}$ α-olefins in the presence of a different polymerization catalyst to obtain a substantially isotactic propylene copolymer comprising from about 91% to about 99.5% propylene by weight of the isotactic propylene copolymer, a melting point by differential scanning calorimetry (DSC) greater than 65° C. or more preferably greater than 75° C. and an MFR greater than 5 dg/min; and (c) blending the propylene polymer of step (a) with the copolymer of step (b), and thereafter blending with the SBCC. In an embodiment, the propylene copolymer (or blend of propylene copolymer with the iPP) can include a plasticizer formed concurrently by the addition of a supplemental catalyst to polymerization step (a), step (b) or the combination thereof for the production of an atactic, amorphous polypropylene or copolymer of propylene and another α-olefin.

In another embodiment, the isotactic propylene copolymer from step (b) can have a maximum MFR less than 1500, less than 1000, less than 500, less than 200, less than 150, less than 100, less than 75, less than 50, less than 30, less than 20, or less than 10 dg/min.

Prochiral catalysts suitable for the preparation of crystalline and semi-crystalline isotactic polypropylene copolymers include those described in U.S. Pat. No. 5,145,819 and U.S. Pat. No. 5,304,614. Additionally, metallocenes such as those described in U.S. Pat. No. 5,510,502 (incorporated herein by reference) is suitable for use in this invention.

An embodiment of this invention generates a soft PC suitable for blending with the tertiary polymer component which contains a lower amount of α-olefin to attain a lower heat of fusion than previously known for these low molecular weight or high MFR polymers. The PC is thus crystallizable in contact with a crystalline polypropylene blend component. It is believed that the lower amount of comonomer in the PC leads to improved redistribution of the PC component into the other blend polymer components due to improved miscibility.

Styrenic Block Copolymer Component

The SBC component may comprise one, two, three or more different styrenic block copolymers (by different is meant that the copolymers differ in comonomer choice, configuration (diblock, triblock, star block, branched block, etc.); or in at least one of block size, Mw, Mz, Mn, $T_m$, comonomer content, comonomer molecular weight, ratio of 1,2 to 1,4 insertions, Hf, Mw/Mn, tensile modulus by at least by at least 10%, preferably at least 40%, preferably at least 100% and preferably at least 500%.

In a preferred embodiment, the SBC component (the single SBC or a blend of two or more SBC's that make up the SBC component) has an MFR of from less than 0.01 to 150 dg/min, preferably 0.5 to 100 dg/min, preferably 1.0 to 50 dg/min.

In a preferred embodiment, the SBC component (or blend of two or more SBC's that make up the SBCC) has a wt. % styrene of 10 to 60 wt. %, preferably 15 to 50 wt. %, preferably at 20 to 40 wt. %, based upon the weight of the SBC component.

Preferred SBC's useful herein are block copolymers of styrene and/or alpha-methyl styrene and an olefin such as an alpha olefin (ethylene, propylene, butene, hexene, octene) and/or an alkadiene (isobutylene, isoprene, butadiene) and hydrogenated or chemically modified versions of the block copolymer. Useful SBC's may be in diblock, triblock, linear (including tapered) or radial (including tapered) block form. Preferred SBC's are SBC rubbers. Particularly preferred SBC's are those such as SEBS, SI, SIS, SB, SBS, SIBS and the like, where S=styrene, EB=random ethylene+butene, I=isoprene, and B=butadiene).

In a preferred embodiment, aromatic segments are present in the SBC at greater than 10%, 15%, 20% or preferably 25% by weight based on the total weight of the SBC. Alternately, the styrenic segments are present in the SBC at 10 to 85 wt. %, preferably 15 to 50 wt. %, preferably at 20 to 50 wt. %, based upon the weight of the SBC.

In a preferred embodiment, the SBC comprises at least one block of styrene and at least one block of units selected from the group consisting of ethylene, butadiene, isoprene, and isobutylene, wherein the SBC comprises of from 10 to 85 wt. % styrene, based upon the weight of the SBC.

Particularly preferred SBC's can include linear block copolymers, exemplified by the structural designations as A-B diblock copolymers, A-B-A triblock copolymers, A-B-A-B tetrablock copolymers, A-B-A-B-A pentablock copolymers, and so on. Such SBC's generally comprise a thermoplastic A block portion and an elastomeric B block portion. The SBC's are elastomeric in the sense that they generally form a three-dimensional physical crosslinked or entangled structure below the glass transition temperature (Tg) of the thermoplastic block portion such that they exhibit elastic memories in response to external forces. The SBC's are thermoplastic in the sense that they can be melted above the endblock Tg, formed, and resolidified several times with little or no change in physical properties, assuming minimum oxidative degradation. The A block portions are the hard blocks and are derived from materials which have a sufficiently high Tg to form crystalline or glassy domains at the use temperature of the polymer. The hard A block portion generally comprises a polyvinylarene derived from monomers such as styrene, $\alpha$-methyl styrene, other styrene derivatives, or mixtures thereof. The hard A block portion may also be a copolymer derived from styrenic monomers such as those described above and olefinic monomers such as ethylene, propylene, butylene, isoprene, butadiene, and so on, and mixtures thereof.

In one embodiment, the hard A block portion can be polystyrene, having a number-average molecular weight between from about 1,000 to about 200,000, preferably from about 2,000 to about 100,000, more preferably from about 5,000 to about 60,000. Typically the hard A block portion comprises from about 5% to about 80%, preferably from about 10% to about 70%, more preferably from about 10% to about 50% of the total weight of the SBC.

The material forming the B block can have sufficiently low Tg at the use temperature of the polymer such that crystalline or glassy domains are not formed at these working temperatures. The B block may thus be regarded as a soft block. The soft B block portion is typically an olefinic polymer derived from conjugated aliphatic diene monomers of from about 4 to about 6 carbon atoms, linear alkene monomers of from about 2 to about 6 carbon atoms, or the like, including mixtures. Representative diene monomers include butadiene, isoprene, and the like. Representative alkene monomers include ethylene, propylene, butylene, and the like.

The soft B block portion typically comprises a substantially amorphous polyolefin such as ethylene/propylene copolymer, ethylene/butylene copolymer, polyisoprene, polybutadiene, and the like or mixtures thereof. The number average molecular weight of the soft B block is typically from about 1,000 to about 300,000, preferably from about 10,000 to about 200,000, and more preferably from about 20,000 to about 100,000. Typically the soft B block portion comprises from about 20% to about 90%, preferably from about 30% to about 80%, more preferably from about 40% to about 80% of the total weight of the SBC. In some embodiments, the soft B blocks comprise at least about 50% by weight of the SBC.

In another embodiment, the SBC's are triblock copolymers having an elastomeric midblock B and thermoplastic endblocks A and A', wherein A and A' may be derived from the same or different vinylarene monomers. In other embodiments, the SBC's can have more than one A block and/or more than one B block, wherein each A block may be derived from the same or different vinylarene monomers and each B block may be derived from the same or different olefinic monomers.

The SBC's may also be radial, having three or more arms, each arm being a B-A, B-A-B-A, or the like type copolymer and the B blocks being at or near the center portion of the radial polymer. In other embodiments, the SBC's may have four, five, or six arms. The unsaturation in olefinic double bonds may be selectively hydrogenated to reduce sensitivity to oxidative degradation and may have beneficial effects on the elastomeric properties. For example, a polyisoprene block can be selectively reduced to form an ethylene-propylene block. In some embodiments, the vinylarene block typically comprises at least about 10% by weight of the SBC. However, higher vinylarene contents may be selected for high elastic and low stress relaxation properties.

Exemplary SBC's in the polymeric compositions described herein are styrene-olefin-styrene triblock copolymers such as styrene-butadiene-styrene (SBS), styrene-co (ethylene/butylene)-styrene (SEBS), styrene-co(ethylene/propylene)-styrene (SEPS), styrene-isoprene-styrene (SIS), and mixtures thereof. The SBC component in the blends with the PC may be a specific SBC or a blend of SBC's. The SBC's may also be used in the polymeric compositions described herein as a blend of one or more SBC's blended with one or more other substantially less elastomeric polymers such as polypropylene, polyethylene, polybutadiene, polyisoprene, or mixtures thereof.

In another embodiment, the SBC in the polymeric compositions described herein can be SEBS block copolymers having a styrene content in excess of about 10% by weight of the SBC. With higher styrene content, the polystyrene block portions generally have a relatively high molecular weight. Preferably, the SBC can have a melt flow rate of about 0.01 to about 150, 0.1 to about 100, or about 1 to about 75 dg/min.

In another embodiment, the polymeric composition includes an SBC comprised of triblock segments comprised of styrene-derived units and at least one other unit selected from the group consisting of ethylene, butadiene, isoprene, isobutylene and wherein the styrenic block copolymer is comprised of less than 20 wt. % of diblock segments. In another embodiment, the polymeric composition incorporates an SBC comprised of segments selected from the group consisting of SIS, SBS, SEBS, SEPS, and SIBS units and wherein from about 5% to about 95% of diene units in the styrenic block copolymer are hydrogenated.

In another embodiment, the SBC of the polymeric compositions has a styrene content of about 5 to about 95, about 10 to about 85, or about 15 to about 70% by weight of the SBC.

SBC's useful herein typically have no $T_m$ or a Tm of 60° C. or less, preferably from 25° C. to 55° C., preferably from 30° C. to 50° C.

SBC's useful herein typically have a Tg (DSC, first melt) of 25° C. or less, preferably from −75° C. to 0° C., preferably from −50° C. to −20° C.

The polymer may have a $T_m$ of 100° C. or less. They can be a linear triblock copolymer or a radial block copolymer. Optionally each of the above polymers can contain a diblock copolymer.

SBC polymers have a dual morphology of hard and soft, chemically connected segments, separated in domains of less than 1 micrometer. The thermal properties of each phase is retained in the final SBC, thus the hard and soft segments retain their Tm and Tg. This implies that in SBC polymer components there can be at most two distinct Tg and two distinct Tm. SBC polymer components are characterized by exceptionally high elongations and strengths much like thermoset or vulcanized rubbers even though SBC polymers are, in theory at least, always melt processable.

Exemplary SBC's for use in the polymeric compositions described herein are commercially available from Dexco Polymers LP (Plaquemine, La.) under the tradename VECTOR™ and from Kraton Polymers (Houston, Tex.) under the tradename KRATON™, particularly Kraton 1641, 6944, 1650, 1657, 1651. SBC's can also be obtained from Total Petrochemicals under the tradename FINAPRENE™ and from ASAHI in Japan, from Dynasol under the tradename Calprene, JSR under the tradename Dynaron, Polimeri under the name Europrene and TSRC under the name TAIPOL and Kuraray America, Inc. under the tradename SEPTON™.

Tertiary Polymer Component

The tertiary polymer component (TPC) is optionally present in the polymeric compositions of the present invention, and may be one polyolefin or a blend of polyolefins. In one embodiment the TPC is comprised of polypropylene, which can be a copolymer of propylene, a mixture of copolymers, or a combination of propylene homopolymers and copolymers. The TPC may also contain additives such as flow improvers, nucleators and antioxidants which are normally added to polypropylene to improve or retain properties.

In one embodiment, the TPC comprises polypropylene having a melting point greater than about 110° C., preferably greater than about 115° C., and most preferably greater than about 130° C. Preferably, the TPC has a heat of fusion greater than 75 J/g.

In a further embodiment, the TPC can include a polypropylene that can vary widely in composition. For example, the TPC propylene copolymer can contain another monomer in an amount equal to or less than about 10% by weight of the TPC, i.e., at least about 90% by weight propylene can be present in the TPC. The TPC may be a combination of homopolypropylene, and/or random, and/or block propylene copolymers as described herein. When the TPC is a random propylene copolymer, the amount of the copolymerized α-olefin in the copolymer is, in general, from about 0.5 to about 9 wt. %, preferably about 2 to about 8 wt. %, and most preferably about 2 to about 6 wt. %, based upon the weight of the TPC. The preferred α-olefins contain 2 or from 4 to about 12 carbon atoms. The most preferred α-olefin is ethylene. One, two or more α-olefins can be copolymerized with propylene in the TPC.

Exemplary α-olefins in the TPC copolymers may be selected from the group consisting of ethylene; butene-1; pentene-1; hexene-1; 2-methylpentene; 1,3-dimethylbutene; heptene-1; 3-methylhexene-1; methylethylbutene-1; 1,3-dimethylpentene; 1,4-dimethylpentene; 1,3,3-trimethylbutene-1; ethylpentene-1; octene-1; dimethylhexene-1; trimethylpentene-1; ethylhexene-1; methylethylpentene-1; diethylbutene-1; propylpentane-1; nonene-1; decene-1; methylnonene-1; dimethyloctene-1; trimethylheptene-1; ethyloctene-1; diethylhexene-1; dodecene-1; hexadodecene-1 and the like.

In a further embodiment, the MFR of the TPC is less than 200, 150, 100, 75, 50, 30, 20, 10, 5, 3, or 2 dg/min. Blends as described in embodiments can be made with an MFR in the TPC below any of these maximum MFR values.

In further embodiments, the TPC may comprise from about 1 to about 95 wt. % of the polymeric composition, preferably from about 20 to about 70 wt. %, and more preferably from about 25 to about 60 wt. %, based upon the weight of the polymeric composition.

There is no particular limitation on the method for preparing the TPC used in the polymeric compositions of the invention. However, in general, copolymers may be obtained by copolymerizing propylene and an α-olefin having 2 or from 4 to about 20 carbon atoms, preferably ethylene, in a single stage or multiple stage reactor. Polymerization methods include high pressure, slurry, gas, bulk, or solution phase, or a combination thereof, using a traditional Ziegler-Natta catalyst or a single-site, metallocene catalyst system. The catalyst used is preferably one which has a high isospecificity. Polymerization may be carried out by a continuous or batch process and may include use of chain transfer agents, scavengers, or other such additives as deemed applicable. Preferred propylene polymers useful herein as TPC's include Escorene™ PP 9302, PP3155, and PP1105 available from ExxonMobil Chemical Co. of Houston, Tex.

Plasticizer

In a further embodiment, a plasticizer can be optimally added to the polymer blend compositions of the present invention. "Plasticizer" refers to any or a variety of predominantly hydrocarbon molecules having molecular weights (Mn) of less than 20,000. The addition of plasticizer in moderate amounts may lower the viscosity and flexibility of the blend while improving the properties of the blend at temperatures near and below 0° C. It is believed that these potential benefits arise by the lowering of the glass transition temperature (Tg) of the blend. Adding plasticizer to the blend may also improve processability and provide a better balance of elastic and tensile strength.

These plasticizers are typically known as extender oils or process oils in rubber applications. Process oils include hydrocarbons having either (a) traces of heteroatoms such as oxygen or (b) at least one hetero atom such as dioctyl phthalate, ethers, and polyethers. Process oils typically have a boiling point to be substantially involatile at 200° C. These process oils are commonly available either as neat solids, liquids, or as physically absorbed mixtures of these materials on an inert support, e.g., clay or silica, to form a free flowing powder. Process oils usually include a mixture of a large number of chemical compounds which may consist of linear, acyclic but branched, cyclic, and aromatic carbonaceous structures. Another family of process oils includes certain organic esters and alkyl ether esters having molecular weights (Mn) of less than 20,000. Combinations of process oils may also be used in the practice of the invention.

The process oil should be compatible or miscible with the polymer blend composition in the melt to form a homogenous one phase blend, and may be substantially miscible at room temperature. Process oils may be added to the blend compositions by any of the conventional means known in the art, including the addition of all or part of the process oil prior to recovery of the polymer, and addition of all or part of the process oil to the polymer as a part of a compounding for the interblending. The addition of process oils to lower the glass transition temperature of blends of isotactic polypropylene and ethylene propylene diene rubber is described in U.S. Pat. No. 5,290,886 and U.S. Pat. No. 5,397,832.

In a further embodiment the plasticizer can be a synthetic alkane lubricant such as a poly-α-olefin (PAO) comprising oligomers of linear olefins having 3 to 14 carbon atoms, more preferably 8 to 12 carbon atoms, more preferably 10 carbon atoms, and having a kinematic viscosity of 10 or more, as measured by ASTM D445. Preferred PAO's have kinematic viscosities in the range of 0.1 to 3000 cSt at 100° C., preferably from 3 to 2000 cSt at 100° C., preferably 10 to 1000 cSt, and or a pour point of 0° C. or less, preferably −20° C. or less and or a flash point of 200° C. or more, preferably 220° C. or more, and or a specific gravity of 0.86 or less, preferably 0.85 or less. Particularly preferred PAO plasticizers include those described at Page 16, line 14 to page 21, line 10 of WO 2004/014998.

In another embodiment the plasticizer may be a high Tg plasticizer (e.g. a Tg of 20° C. or more). The use of a high Tg plasticizer has a distinct effect on the properties of the blend in response to changes in temperature in such a way that it may be possible at room temperature to have blends which have a characteristic leathery feel in contrast to the formation of blends which have a rubbery feel when low Tg components are used as plasticizers.

In various embodiments, the compositions described herein may contain plasticizer in the range of from 0 to 500 parts by weight, or from 2 to 200 parts by weight, or from 5 to 150 parts by weight, or from 10 to 100 parts by weight, per hundred parts of total polymer by weight.

Various types of natural and synthetic resins (also referred to as tackifying resins), alone or in admixture with each other, can be blended with the polymeric compositions described herein, preferably at amounts of from 1 to 70 wt. %, preferably 5 to 35 wt. % based upon the weight of the blend. Suitable resins include, but are not limited to, natural rosins and rosin esters, hydrogenated rosins and hydrogenated rosin esters, coumarone-indene resins, petroleum resins, polyterpene resins, and terpene-phenolic resins. Specific examples of suitable petroleum resins include, but are not limited to aliphatic hydrocarbon resins, hydrogenated aliphatic hydrocarbon resins, mixed aliphatic and aromatic hydrocarbon resins, hydrogenated mixed aliphatic and aromatic hydrocarbon resins, cycloaliphatic hydrocarbon resins, hydrogenated cycloaliphatic resins, mixed cycloaliphatic and aromatic hydrocarbon resins, hydrogenated mixed cycloaliphatic and aromatic hydrocarbon resins, aromatic hydrocarbon resins, substituted aromatic hydrocarbons, and hydrogenated aromatic hydrocarbon resins. As used herein, "hydrogenated" includes fully, substantially and at least partially hydrogenated resins. Suitable aromatic resins include aromatic modified aliphatic resins, aromatic modified cycloaliphatic resin, and hydrogenated aromatic hydrocarbon resins. Any of the above resins may be grafted with an unsaturated ester or anhydride to provide enhanced properties to the resin.

While the above discussion has been limited to the description of the invention in relation to having only the PCC and SBC, and optionally the TPC and/or plasticizer and or natural and synthetic resins, those skilled in the art will appreciate that the polymer blend compositions of the present invention may comprise other additives. Various additives may be present to enhance a specific property or may be present as a result of processing of the individual components. Additives which may be incorporated include, for example, fire retardants, antioxidants, plasticizers, pigments, vulcanizing or curative agents, vulcanizing or curative accelerators, cure retarders, processing aids, flame retardants, and the like. These compounds may include fillers (including granular, fibrous, or powder-like) and/or reinforcing materials. These include carbon black, clay, talc, calcium carbonate, mica, silica, silicate, glass combinations thereof, and the like. Other additives which may be employed to enhance properties include antiblocking agents, coloring agents. Lubricants, mold release agents, nucleating agents, and reinforcements may also be employed. The list described herein is not intended to be inclusive of all types of additives which may be employed with the present invention. Upon reading this disclosure, those of skill in the art will appreciate other additives may be employed to enhance properties of the composition. As is understood by the skilled in the art, the polymer blend compositions of the present invention may be modified to adjust the characteristics of the blend as desired.

The addition of process aids, such as a mixture of fatty acid ester or calcium fatty acid soap bound on mineral filler, to the compositions described herein may help the mixing of the composition and the injection of the composition into a mold. Other examples of process aids are low molecular weight polyethylene copolymer wax and paraffin wax. The amount of process aid used may be within the range of from 0.5 to 5 parts by weight per hundred parts total polymer.

Adding antioxidants to the compositions described herein may improve the long term aging. Examples of antioxidants include, but are not limited to quinoline, e.g., trimethylhydroxyquinoline (TMQ); imidazole, e.g., zincmercapto tolyl imidazole (ZMTI), and conventional antioxidants, such as hindered phenols, lactones, and phosphites. The amount of antioxidants used may be within the range of from 0.01 to 5 parts by weight per 100 parts total polymer components by weight. A useful anti-oxidant is Irganox™ 1010.

Some embodiments of the polymeric compositions described herein can further include a EP Rubber (at from 1 to 50 wt. %, based upon the weight of the blend). For purposes of this invention and the claims thereto, an EP Rubber is defined to be a copolymer of ethylene and an alpha olefin (such as propylene, butene, hexene, octene), and optionally diene monomer(s), where the ethylene content is from 35 to 80 wt. %, the diene content is 0 to 15 wt. %, and the balance is propylene with a minimum propylene content of 20 wt. %; and where the copolymer has a Mooney viscosity, ML(1+4) @ 125° C. (measured according to ASTM D1646) of 15 to 100. For purpose of this invention such EP Rubbers are not TPC's.

In another embodiment, the elastomeric performance properties of the blend may be improved by crosslinking the EP Rubber and/or the other polymeric components of the polymeric compositions described herein, to various degrees, and/or the crosslinking can permit convenient processing. In some embodiments, as described above, the EP Rubber may include a polyene to facilitate crosslinking and optimal end use performance in various options of formulation and processing. In other embodiments, such as when using radiation to induce the crosslinking reaction, the presence of diene in the EP Rubber is optional. Curing may provide improved recovery from tensile deformation, improved stress relaxation, and prevent loss of shape of molded or extruded product and increase the service temperature for the article. The degree of crosslinking may vary and can be measured by determining the % by weight of the specimen of insolubles in boiling xylene which, in one embodiment, may vary from about 10 to about 90% by weight of the EP Rubber. Continued curing may lead to gelling and finally to the immobilization of the polymers from extensive crosslinking.

Curing may be effected by any suitable system, such as by using free radicals. In one embodiment, curing is accomplished through irradiation. Curing may also be effected chemically using functionalities in the polymer such as unreacted unsaturated end moieties that remain after diene incorporation. The crosslinking reaction may then be referred to as vulcanization. A crosslinking agent is used to activate the functionality such as sulfur based curatives, peroxide curatives, phenolic resin cure, hydrosilylation, and labile or migratory cure systems such as sulfur dichloride.

Blending

It is understood that any or all of the above embodiments are directed to a process for preparing fabricated articles from the polymeric compositions described herein. The process comprises: (a) generating the polymeric compositions (as described above), and (b) forming the article by casting, blowing, injection molding, extrusion, rotomolding or compression molding as known in the art.

The polymeric compositions of the present invention may be prepared by any procedure that produces an intimate mixture of the components. For example, the components can be combined by melt pressing the components together on a Carver press to a thickness of about 0.5 millimeter (20 mils) and a temperature of about 180° C., rolling up the resulting slab, folding the ends together, and repeating the pressing, rolling, and folding operation about 10 times. Internal mixers are particularly useful for solution or melt blending. Blending at a temperature of about 180° C. to 240° C. in a BRABENDER Plastograph for about 1 to 20 minutes has been found satisfactory. Still another method that may be used for admixing the components involves blending the polymers in a BANBURY internal mixer above the flux temperature of all of the components, e.g., 180° C. for about 5 minutes. A complete mixture of the polymeric components is indicated by the uniformity of the morphology of the dispersion of the components of the mixture. Continuous mixing may also be used. These processes are well known in the art and include single and twin screw mixing extruders, static mixers for mixing molten polymer streams of low viscosity, impingement mixers, as well as other machines and processes, designed to disperse the PDC and the SBC in intimate contact.

As discussed above, the unique combination of processability and performance attributes of the polymeric compositions described herein make them useful to produce a variety of different types of materials to produce a wide assortment of products. Among the materials that may be produced using the polymeric compositions described herein are films, fibers, woven and non-woven fabrics, sheets, molded objects, extruded forms, and thermoformed objects. In particular the unanticipated ability of the PC to lower the viscosity of the blend composition containing SEBS relative to process oil and yet retain softness and malleability leads to the formation of elastic, extensible and soft blend compositions which can be easily processed and fabricated into a range of different forms. The following describes the manner in which some of these materials may be formed from the polymeric compositions described herein.

Yarns and fibers: In one embodiment, the polymeric compositions may be used to produce fibers. Fibers of the polymeric compositions described herein have desirable softness and elastic properties and may be used in various applications, for example, continuous filament yarn, bulked continuous filament yarn, staple fibers, melt blown fibers, and spunbond fibers. In a particular aspect of this embodiment, fibers comprising a composition described herein may have the advantage that it may be easily spun into fibers by extrusion through a spinneret followed by drawing to the desired denier. In one embodiment, the elastic recovery, stress relaxation, and tensile recovery properties of the fibers of the invention may be enhanced by annealing and/or mechanical orientation. Annealing partially relieves the internal stress in the stretched fiber and restores the elastic recovery properties of the blend in the fiber. Annealing has been shown to lead to significant changes in the internal organization of the crystalline structure and the relative ordering of the amorphous and semicrystalline phases, which leads to recovery of the elastic properties. The fiber may be annealed at a temperature of at least 4-5° C. above room temperature, or at least 6-7° C. above room temperature, but slightly below the crystalline melting point of the blend composition. Thermal annealing is conducted by maintaining the polymer fiber at a temperature of from room temperature to 160° C., or 130° C., for a period of from 15 seconds to 7 days. A typical annealing period is 3 days at 50° C. or 5 minutes at 100° C. The annealing time and temperature can be adjusted for any particular polymer fiber by experimentation. It is believed that during this annealing process, there is intermolecular rearrangement of the polymer chains, leading to a material with greater recovery from tensile deformation than the unannealed material.

Annealing of the fiber is done in the absence of mechanical orientation; however, mechanical orientation can be a part of the annealing process, e.g., after the extrusion operation. Mechanical orientation can be done by the temporary, forced extension of the polymer fiber for a short period of time before it is allowed to relax in the absence of extensional forces. It is believed that the mechanical orientation of the fiber leads to reorientation of the crystallizable portions of the fiber. Oriented polymer fibers are conducted by maintaining the polymer fibers at an extension of 100% to 700% for a period of 0.1 seconds to 24 hours. A typical orientation is an extension of 200% for a momentary period at room temperature.

For orientation of a fiber, the polymeric fiber at an elevated temperature, but below the crystalline melting point of the polymeric composition, is passed from a feed roll of fiber around two rollers driven at different surface speeds and finally to a take-up roller. The driven roller closest to the take-up roll is driven faster than the driven roller closest to the feed roll, such that the fiber is stretched between the driven rollers. The assembly may include a roller intermediate the second roller and take-up roller to cool the fiber. The second roller and the take up roller may be driven at the same peripheral speeds to maintain the fiber in the stretched condition. If supplementary cooling is not used, the fiber will cool to ambient temperature on the take-up roller.

In one embodiment, the invention provides fabrics made with the fibers made of the polymeric compositions described herein. The fabrics may be made by any of the known processes for making non-woven or woven fabrics.

Molded Products: The polymeric composition described above may also be used to prepare molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion.

The compositions described herein may be shaped into desirable end use articles by any suitable means known in the art. Thermoforming, vacuum forming, blow molding, rotational molding, slush molding, transfer molding, wet lay-up or contact molding, cast molding, cold forming matched-die molding, injection molding, spray techniques, profile co-extrusion, or combinations thereof are typically used methods.

Thermoforming is a process of forming at least one pliable plastic sheet into a desired shape. In an embodiment, an extrudate film of the composition of this invention (and any other layers or materials) is placed on a shuttle rack to hold it during heating. The shuttle rack indexes into the oven which pre-heats the film before forming. Once the film is heated, the shuttle rack indexes back to the forming tool. The film is then vacuumed onto the forming tool to hold it in place and the forming tool is closed. The forming tool can be either "male" or "female" type tools. The tool stays closed to cool the film and the tool is then opened. The shaped laminate is then removed from the tool. Thermoforming is accomplished by vacuum, positive air pressure, plug-assisted vacuum forming, or combinations and variations of these, once the sheet of material reaches Thermoforming temperatures are typically from 140° C. to 185° C. or higher. A pre-sketched bubble step is used, especially on large parts, to improve material distribution. In one embodiment, an articulating rack lifts the heated laminate towards a male forming tool, assisted by the application of a vacuum from orifices in the male forming tool. Once the laminate is firmly formed about the male forming tool, the thermoformed shaped laminate is then cooled, typically by blowers. Plug-assisted forming is generally used for small, deep drawn parts. Plug material, design, and timing can be critical to optimization of the process. Plugs made from insulating foam avoid premature quenching of the plastic. The plug shape is usually similar to the mold cavity, but smaller and without part detail. A round plug bottom will usually promote even material distribution and uniform side-wall thickness.

The shaped laminate is then cooled in the mold. Sufficient cooling to maintain a mold temperature of 30° C. to 65° C. is desirable. The part has a temperature below 100° C. before ejection in one embodiment. For good behavior in thermoforming, lower MFR blends are desirable. The shaped laminate is then trimmed of excess laminate material.

In an embodiment of the thermoforming process, the oven temperature is between 160° C. and 195° C., the time in the oven between 10 and 20 seconds, and the die temperature, typically a male die, between 10° C. and 71° C. The final thickness of the cooled (room temperature), shaped laminate is from 10 um to 6000 um in one embodiment, from 200 um to 6000 um in another embodiment, and from 250 um to 3000 um in yet another embodiment, and from 500 um to 1550 um in yet another embodiment, a desirable range being any combination of any upper thickness limit with any lower thickness limit.

Blow molding is another suitable forming means, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, Kroschwitz, *Concise Encyclopedia of Polymer Science and Engineering*, John Wiley & Sons, 90-92 (1990). In yet another embodiment, the polymeric compositions described herein may be secured to a substrate material using a blow molding operation. Blow molding is particularly useful in such applications as for making closed articles such as fuel tanks and other fluid containers, playground equipment, outdoor furniture and small enclosed structures. In one embodiment of this process, the polymeric compositions described herein are extruded through a multi-layer head, followed by placement of the uncoated laminate into a parison in the mold. The mold, with either male or female patterns inside, is then closed and air is blown into the mold to form the part.

In yet another embodiment of the formation and shaping process, profile co-extrusion can be used. The profile co-extrusion process parameters are as above for the blow molding process, except the die temperatures (dual zone top and bottom) range from 150° C.-235° C., the feed blocks are from 90° C.-250° C., and the water cooling tank temperatures are from 10° C. to 40° C.

One embodiment of an injection molding process is described as follows. The shaped laminate is placed into the injection molding tool. The mold is closed and the substrate material is injected into the mold. The substrate material has a melt temperature between 200° C. and 300° C. in one embodiment, and from 215° C. and 250° C. in another, and is injected into the mold at an injection speed of between 2 and 10 seconds. After injection, the material is packed or held at a predetermined time and pressure to make the part dimensionally and aesthetically correct. Typical time periods are from 5 to 25 seconds and pressures from 1,380 kPa to 10,400 kPa. The mold is cooled between 10° C. and 70° C. to cool the substrate. The temperature will depend on the desired gloss and appearance desired. Typical cooling time is from 10 to 30 seconds, depending on part on the thickness. Finally, the mold is opened and the shaped composite article ejected.

Likewise, molded articles may be fabricated by injecting molten polymer into a mold that shapes and solidifies the molten polymer into desirable geometry and thickness of molded articles.

Sheets may be made either by extruding a substantially flat profile from a die, onto a chill roll, or alternatively by calendaring. Sheets will generally have a thickness of from 100 to 2000 µm although the sheets may be substantially thicker.

In an embodiment of the injection molding process, wherein a substrate material in injection molded into a tool including the shaped laminate, the melt temperature of the substrate material is between 230° C. and 255° C. in one embodiment, and between 235° C. and 250° C. in another embodiment, the fill time from 2 to 10 seconds in one embodiment, from 2 to 8 seconds in another embodiment, and a tool temperature of from 25° C. to 65° C. in one embodiment, and from 27° C. to 60° C. in another embodiment. In a desirable embodiment, the substrate material is at a temperature that is hot enough to melt any tie-layer material or backing layer to achieve adhesion between the layers.

Two shot overmolding: Plastic handles of various shapes and sizes are found on many household items. Such household items include toothbrushes, shaving razors, hairbrushes, pens, tools, kitchen appliances and kitchen utensils. These household items have a variety of functions, but in most cases, it is desirable for the user to grip the handle of these items firmly, so that it does not fall out of the user's hand. In other cases, such as with a knife or fork or a tool, it is desirable for the item to be gripped with even more firmness so that it can be leveraged. Because the handles of these household items are normally made of a hard plastic, the simplest tasks can become problematic. As in the case of a toothbrush or shaving razor, the handle generally comes into contact with water. When the toothbrush or razor is wet, it is difficult to grip and may slip out of the user's hands. Other items such as tools or kitchen utensils can have handles that are difficult to hold onto or uncomfortable to grip because of the hardness of the plastic material. For persons suffering from arthritis, carpal tunnel syndrome or other hand injuries or infirmities, using these basic household objects can become more difficult or even impossible. Most people would prefer to grip objects with a softer handle that is more soothing to the touch and easier to grip. Accordingly, a need exists for a soft grip handle that can be grasped firmly and comfortably and which requires minimum strength and dexterity to grip and maneuver.

The overmolding of the soft thermoplastic composition can be achieved by a two shot or multi-component injection molding process or co-injection molding process. Such processes are generally described in "Special Technologies for Injection Moulding of TPE", Peter Pokorny, Engel Maschinebau GmbH, TPE 2000, 6 & 7 Mar. 2000, Paper 17, Amsterdam, conference proceedings. The teaching of this reference is incorporated herein by reference. The soft-thermoplastic elastomer overmolded onto the hard thermoplastic resin substrates are also described in "New Horizons in Thermoplastic Elastomers", Stephen J. Duckworth, M. A. Hanna Engineered Materials Europe, TPE 2000, 6 & 7 Mar. 2000, Paper 5, Amsterdam, and the teaching thereof are also incorporated herein by reference. The soft overmolding can also be accomplished by insert injection molding carried out in two steps. In the first step, the thermoplastic substrate is molded and is subsequently inserted in another cavity for overmolding in the next step into the soft thermoplastic elastomer. The soft thermoplastic elastomers can be overmolded on a rigid metal substrate by insert injection molding processes. The soft thermoplastic elastomer composition can also be processed by either an extrusion or an injection molding process and the formed soft sleeve can be slipped onto the solid thermoplastic or metal substrate.

It will be understood by those skilled in the art that the steps outlined above may be varied, depending upon the desired result. For example, an extruded sheet of the compositions described herein may be directly thermoformed or blow molded without cooling, thus skipping a cooling step. Other parameters may be varied as well in order to achieve a finished composite article having desirable features.

Extrusion: Tubing or pipe may be obtained by profile extrusion of the polymeric compositions described herein for uses in medical, potable water, land drainage applications or the like. The profile extrusion process involves the; extrusion of molten polymer through a die. The extruded tubing or pipe is then solidified by chill water or cooling air into a continuous extruded articles. The tubing will generally be in the range of from 0.31 cm to 2.54 cm in outside diameter, and have a wall thickness in the range of from 254 um to 0.5 cm. The pipe will generally be in the range of from 2.54 cm to 254 cm in outside diameter, and have a wall thickness in the range of from 0.5 cm to 15 cm.

Sheets and Films: Sheets made from the polymeric compositions described herein may be used to form containers. Such containers may be formed by thermoforming, solid phase pressure forming, stamping and other shaping techniques. Sheets may also be formed to cover floors or walls or other surfaces.

The polymeric compositions described herein are also useful for the production of films. Methods for making the films of the polymeric compositions include those which are well known to those of ordinary skill in the art, including, but not limited to conventional tubular extrusion, or a blown bubble process, and cast extrusion. The extrusion temperatures, die temperatures, and chill roll temperatures are dependent on the composition employed, but will generally be within the following ranges for the compositions described herein: melt temperature, 170° C. to 250° C.; die temperature, 170° C. to 250° C.; and chill roll temperature, 10° C. to 65° C. The film-making process may also include embossing rolls to chill and form the film.

The films of the invention may have a layer adhered to one or both sides of the film comprising the polymeric compositions described herein. The layers may be adhered by coextrusion of the film with the optional additional layer or layers. In coextruded films, the individual layers are different in composition and retain their composition except at the interface layer. The optional additional layer may be, for example, a soft material such as an ethylene copolymer which may reduce the adhesive (i.e., sticky) feel of the inventive film. The optional additional layer may also be, for example, a thermoplastic. A thermoplastic layer may be used, for example, as a mechanical support for an elastic film to prevent sag, and as a barrier to adhesion of the polymer film to other surfaces. A thermoplastic layer may become a part of the integral use of an elastic film in that the composite film is stretched beyond the yield point of the thermoplastic layer, e.g., greater than 50% elongation, and allowed to retract due to the elastic forces of the elastic film. In this use, the thermoplastic film is wrinkled to yield a desirable surface finish of the composite elastic film. The thermoplastics that may be used for this purpose include, but are not limited to polypropylene and polyethylene.

In one embodiment, the mechanical properties, such as elastic recovery and stress relaxation, of films of the invention may be enhanced by thermal annealing and/or mechanical orientation. Thermal annealing is conducted by maintaining the polymer blend or article made from the blend at a temperature between room temperature and 160° C. for a period of from 15 seconds to 7 days. A typical annealing period is 3 days at 50° C. or 5 minutes at 100° C. The annealing time and temperature can be adjusted for any particular blend composition by experimentation. It is believed that during this annealing process, there is intermolecular rearrangement of the polymer chains, leading to a material with greater recovery from tensile deformation than the unannealed material. Mechanical orientation can be done by the temporary, forced extension of the blend along one or more axes for a short period of time before it is allowed to relax in the absence of extensional forces. It is believed that the mechanical orientation of the polymer leads to reorientation of the crystallizable portions of the blend. Orientation is conducted by maintaining the polymer blend or article made from the blend at an extension of 10% to 400% for a period of 0.1 seconds to 24 hours. A typical orientation is an extension of 200% for a momentary period (generally less than 1 minute) at room temperature.

Orientation of a film may be carried out in the machine direction (MD) or the transverse direction (TD) or both directions (biaxially) using conventional equipment and processes. For orientation in the MD, a polymeric film at an elevated temperature, but below the crystalline melting point of the polymer, is passed from a feed roll of film around two rollers driven at different surface speeds and finally to a take-up roller. The driven roller closest to the take-up roll is driven faster than the driven roller closest to the feed roll, such that the film is stretched between the driven rollers. The assembly may include a roller intermediate the second roller and take-up roller to cool the film. The second roller and the take-up roller may be driven at the same peripheral speeds to maintain the film in the stretched condition. If supplementary cooling is not used, the film will cool to ambient temperature on the take-up roller. The degree of stretch will depend on the relative peripheral speeds of the driven rollers and the distance between the rollers. Stretch rates of 50%/minute to 500%/minute will be satisfactory for most MD orientation applications.

For orientation in the TD, the film orientation is carried out in a tentering device or a double bubble process. In the tenter frame process, the film is cast or unwound from a film roll and then gripped by the edges for processing through the orientation steps. The film is passed successively through a preheat step, a stretching step at elevated temperatures, e.g., from 37° C. to a temperature slightly below the crystalline melting point of the ethylene crystallizable copolymer, an annealing step, and finally a cooling step. During the steps of preheating and stretching and a portion of the annealing step, the temperature is controlled at an elevated temperature, but below the crystalline melting point of the polymer. Tension may be maintained on the film during the annealing and cooling steps to minimize shrinkback. Upon cooling to ambient temperature, i.e., room temperature, or near ambient, the holding force may be released. The film may contract somewhat or "snapback" in the TD, but will retain a substantial portion of its sketched length. The tenter operating conditions can vary within relatively wide ranges and will depend on the several variables; including, for example, film composition, film thickness, degree of orientation desired, and annealing conditions.

As indicated earlier, the orientation process may include an annealing step. Annealing partially relieves the internal stress in the stretched film and dimensionally stabilizes the film for storage. Annealing may be carried out in a time and temperature dependent relationship. In a particular process for film orientation, an interdigitating grooved roller assembly is used to simultaneously produce a desirable crinkled surface finish and orient the film. Such a process is described in U.S. Pat. No. 4,368,565. In this process, the film is stretched between two interlocking grooved rollers which are able to both biaxially stretch the film and orient it.

Exemplary articles made using the polymeric compositions described herein include cookware, storageware, toys, medical devices, sterilizable medical devices, sterilization containers, sheets, crates, containers, packaging, wire and cable jacketing, pipes, geomembranes, sporting equipment, chair mats, tubing, profiles, instrumentation sample holders and sample windows, outdoor furniture, e.g., garden furniture, playground equipment, automotive, boat and water craft components, and other such articles. In particular, the compositions are suitable for automotive components such as bumpers, grills, trim parts, dashboards and instrument panels, exterior door and hood components, spoiler, wind screen, hub caps, mirror housing, body panel, protective side molding, and other interior and external components associated with automobiles, trucks, boats, and other vehicles. In particular, the polymeric compositions described herein are useful for producing "soft touch" grips in products such as personal care articles such as toothbrushes, etc.; toys; small appliances; packaging; kitchenware; sport and leisure products; consumer electronics; PVC and silicone rubber replacement medical tubing; industrial hoses; and shower tubing.

Accordingly, the present invention provides the following embodiments:
1. A polymeric composition comprising:
   from about 1 to about 99 wt. %, based on the total weight of hydrocarbons in the polymeric composition, of a propylene copolymer component comprising a at least one or more copolymers comprising at least 65 wt. % propylene (based upon the weight of the copolymer), wherein the copolymer has an MFR from 250 to 7500 dg/min, an annealed heat of fusion between 0.5 and 40 J/g, and an isotactic triad fraction of at least 75%;
   blended therewith, from about 99 to about 1 wt. %, based on the total weight of hydrocarbons in the polymeric composition, of a styrenic block copolymer component comprising one or more elastomeric styrenic block copolymers; and
   wherein the polymeric composition has an MFR of at least 50 dg/min and a flexural modulus less than 100 MPa.
2. The polymeric composition of paragraph 1 wherein the propylene copolymer comprises at least 75 wt. % of propylene and at least 5 wt. % of comonomer.
3. The polymeric composition of paragraph 1 or 2 wherein the propylene copolymer comprises from about 5 wt. % to about 20 wt. % ethylene.
4. The polymeric composition of paragraph 1, 2 or 3, wherein the propylene copolymer has:
   a melting point between 25° C. and 110° C.;
   a heat of fusion from 1.0 to 125 J/g;
   a tacticity index (m/r) from 4 to 12;
   a reactivity ratio product $r_1 r_2$ of less than 1.5; and
   an Mw/Mn between 1.5 and 40.
5. The polymeric composition of any of paragraphs 1 to 4 wherein the propylene copolymer has one or more of the following characteristics:
   a) an elasticity in % equal to or less than 0.935M+12 where M is the 500% tensile modulus in MPa and is at least 0.5 MPa;
   b) a proportion of inversely inserted propylene units greater than 0.5%, based on 2.1 insertion of propylene monomer in all propylene insertions;
   c) a proportion of inversely inserted propylene units greater than 0.05%, based on 1.3 insertion of propylene monomer in all propylene insertions; and
   d) less than 10000 ppm by weight of the copolymer of a molecular degradation agent or its reaction products.
6. The polymeric composition of any of paragraphs 1 to 5 wherein the propylene-dominated copolymer component comprises two or more propylene copolymers.
7. The polymeric composition of any of paragraphs 1 to 6 wherein the styrenic block copolymer component has an MFR of from 0.1 to 150.
8. The polymeric composition of any of paragraphs 1 to 7 wherein the styrenic block copolymer comprises at least one block of styrene and at least one block of monomers selected from the group consisting of ethylene, butadiene, isoprene, and isobutylene, wherein the styrenic block copolymer comprises from 10 to 85 wt. % styrene, based upon the weight of the styrenic block copolymer.
9. The polymeric composition of any of paragraphs 1 to 8 having an MFR-tensile number greater than 2500 according to the equation:

$$MTN = (MFR)^2 (M)^{1/2}$$

wherein MTN is the MFR-tensile number, MFR is the melt flow rate of the polymeric composition in dg/min and M is the 500% tensile modulus in MPa.
10. The polymeric composition of any of paragraphs 1 to 9 wherein the propylene-dominated copolymer component comprises from 5 to 50 wt. % by weight of the hydrocarbon components of the blend, and the styrenic block copolymer component comprises from 95 to 50 wt. % by weight of the hydrocarbon components of the blend.
11. The polymeric composition of any of paragraphs 1 to 10 wherein the propylene copolymer comprises from about 0.5 to about 3 wt. % diene, based upon the weight of the propylene copolymer.
12. The polymeric composition of any of paragraphs 1 to 11 further comprising from about 1 to about 98% by weight of the hydrocarbon components of the blend of a tertiary polymer component having a melting point greater than about 110° C. and selected from the group consisting of propylene homopolymers, random propylene copolymers and propylene-styrene block copolymers.
13. The polymeric composition of paragraph 12 wherein the tertiary polymer component is selected from isotactic polypropylene, and random copolymers of propylene and α-olefins including ethylene, wherein the tertiary polymer component contains at least 90% by weight of the tertiary polymer component of propylene.
14. The polymeric composition of any of paragraphs 1 to 13 further comprising from 2 to 200 parts by weight of a plasticizer per hundred parts by weight of total polymer.
15. A process for making the polymeric composition of any of paragraphs 1 to 14, comprising melt blending the propylene-dominated copolymer component and the styrenic block copolymer component.
16. The process of paragraph 15 further comprising melt blending with the propylene-dominated copolymer and styrenic block copolymer components a tertiary polymer component having a melting point greater than about 110° C. and selected from the group consisting of propylene homopolymers, random propylene copolymers and propylene-styrene block copolymers.

17. The process of paragraph 15 or 16 further comprising forming a film, fabric, fiber, sheet, molded object, extruded form or thermoformed article from the melt.

18. The process of paragraph 17 further comprising weld bonding the film, fabric, fiber, sheet, molded object, extruded form or thermoformed article to a polypropylene substrate.

19. The polymeric composition of any of paragraphs 1 to 14 in a film, fabric, fiber, sheet, molded object, extruded form or thermoformed article.

20. The polymeric composition obtained from the process of paragraph 15.

EXAMPLES

Melt flow rate (MFR) was determined according to ASTM D1238-04C at 230° C. under a load of 2.16 kg and is reported as dg/min. Flexural modulus was determined as 1% secant according to D790-0310618-05 and is reported as MPa (psi). Melt viscosity the propylene copolymers was measured according to ASTM D3236 using a Brookfield Thermosel viscometer at 190° C. and reported as mPa-s. Melting temperature ($T_m$) was measured by differential scanning calorimetry (DSC, second melt) according to ASTM D3418.

Dynamic mechanical thermal analysis (DMTA) was used to measure the polymer glass transition temperatures, $T_{g1}$ and $T_{g2}$, assigned based on the loss tangent maximum. The instrument used was the Rheometrics Solid Analyzer RSA II in tension mode with settings at 0.05% strain, 1 Hz frequency, 2° C./min heating rate, and a temperature range of about −100° C. to 150° C., unless otherwise noted. Molded samples had dimensions of about 23 mm×6.42 mm×0.7 mm and were conditioned under ambient conditions for 24 hr before the DMTA runs.

Hardness was measured according to ASTM 2240 from molded plaques using a portable hardness Type A durometer (Shore™ Instrument & Mfg. Co., Inc., Freeport, N.Y.). The instantaneous value was reported.

Tensile strength and stress strain values were obtained from samples tested according to ASTM D638, except that the separation of the grips was conducted at 50.8 cm/min (20 in/min). The extension of the grips and thus the samples was independently determined using an extensometer attached to the testing apparatus. The tensile strength data were reported in engineering units (MPa or psi), and the elongation was reported as the % elongation of the distension zone of the sample.

Propylene copolymer compositions were determined depending on the type and amount of comonomer present. For propylene copolymers with an ethylene content between 5 and 40 wt. % ethylene, the ethylene content was determined using a thin homogeneous film pressed according to sub-method A of ASTM D-3900. The film was then mounted on a Perkin Elmer Spectrum 2000 infrared spectrophotometer. A full spectrum was recorded with a resolution of 4.0 $cm^{-1}$ and a spectral range of 4500 to 450 $cm^{-1}$. Ethylene content was determined by taking the ratio of the propylene band area at 1155 $cm^{-1}$ to the ethylene band area at 732 $cm^{-1}$ and applying the following equation:

$$\text{Wt. \% Ethylene} = 73.492 - 89.298X + 15.637X^2$$

where $X = AR/(AR+1)$ and AR is the propylene-to-ethylene peak area ratio (1155 $cm^{-1}$/722 $cm^{-1}$). For α-olefin comonomers other than ethylene, the CNMR technique described in *Macromol. Cem. Phys.*, vol. 201, p. 401 (2000) for the determination of hexene content in propylene/hexene copolymers is used. The procedure involves collecting a CNMR spectrum on a polymer sample dissolved in tetrachloroethane-d2 and integrating the spectral intensity. For example, mole % hexene is determined by taking the ratio of peak integrals corresponding to the number of moles of hexene to the number of moles of all monomers in the sample.

Molecular weight by GPC was determined, for the polyolefins including the propylene copolymers and isotactic polypropylene (iPP), including weight average molecular weight (Mw) and number average molecular weight (Mn), using a Waters 150 size exclusion chromatograph (SEC) equipped with a differential refractive index detector (DRI), an online low angle light scattering (LALLS) detector and a viscometer (VIS), with detector calibrations described in Sun et al., *Macromolecules*, vol. 34, no. 19, pp. 6812-6820 (2001). For the SEBS polymers a Waters GPC using THF as the permeation solvent equipped with UV and DRI detectors was used to determine the Mn of the SEBS blocks. The composition of the block copolymers, expressed as wt. % styrene end-block, was obtained by $^1H$ NMR using a Varian XL 400 with deuterated chloroform as the solvent.

Compression set data was generated at 25° C. and 100° C. according to ASTM D 395. A constant deflection of 25% and a duration of 22 hours were used.

Ingredient properties for these examples are shown in Table 1A for the SBC, Table 1B for the propylene polymers and Table 1C for the additional ESCORENE iPP polymers. SBC resins were obtained from Kraton Polymers U.S. LLC, Houston, Tex. ESCORENE iPP resins were obtained from ExxonMobil Chemical Co, Houston, Tex. The propylene polymers were made as exemplified below. Wollastonite is a pulverized calcium silicate ($CaSiO_3$) filler. An example of this is NYGLOS STPO from Nyco Minerals.

TABLE 1A

Kraton ™ SBC polymers used in the examples

| Material | $M_n$ | MFR, dg/min | Wt. % Styrene | DSC $T_{g1}$, ° C. | DMTA $T_{g1}$, ° C. | DMTA $T_{g2}$, ° C. | $T_m$, ° C. | Hardness (Shore A) |
|---|---|---|---|---|---|---|---|---|
| KG 1641H | 157,000 | <1 | 34 | | −40 | 103 | — | 76** |
| KG 6944E | 229,000 | <1 | 30 | | | | 38 | |
| KG 1650 | 88,000 | <1 | 28 | −60 | −45 | 100 | 34 | 81** |
| KG 1657 | 75,000 | 9.9 | 14 | −65 | | | 8 | 53** |
| KG 1651 | | | 33* | | | | | 60* |

*10-sec value obtained from Kraton Polymers.
**Instantaneous value measured by inventors.

TABLE 1B

Propylene copolymers used in the examples

| Material | $M_n$ | $M_w$ | η, cp | MFR, dg/min | Wt. % ethylene | $T_m$, ° C. | ΔH, J/g |
|---|---|---|---|---|---|---|---|
| PDC1[A] | | | 19,420 | | 13 | | 12 |
| PDC2 | 29,000 | 59,000 | 12,650 | 1694 | 12 | 58 | 18 |
| PDC3 | 28,000 | 60,000 | 21,700 | 1787 | 14 | 53 | 4.8 |

[A] = PDC-1 is a blend of PDC-3 and a 9 wt. % metallocene iPP (Achieve 6936G).

TABLE 1C iPP used in the examples

| Material | $M_n$ | $M_w$ | η, cp | MFR, dg/min | $T_m$, ° C. | ΔH, J/g |
|---|---|---|---|---|---|---|
| PP3155 | 47889 | 163054 | | 36 | 161 | 105 |
| PP1105E1 | | | | 35 | | |
| Achieve 6936G | 25000 | 60000 | 1500 | | 153 | 105 |

Procedures for production of PDC2 and PDC3 included polymerization in a liquid filled, single-stage continuous reactor using a single metallocene catalyst systems. The reactor was a 0.5-liter stainless steel autoclave reactor and was equipped with a stirrer, water cooling/steam heating element with a temperature controller, and a pressure controller. Solvents, propylene, and comonomers, such as hexane and octane, were first purified by passing through a three-column purification system. The purification system consisted of an Oxiclear column, Model # RGP-R1-500 from Labclear, followed by 5A and 3A molecular sieve columns. Purification columns were regenerated periodically whenever there was evidence of lower activity of polymerization. Both the 3A and 5A molecular sieve columns were regenerated in-house under nitrogen at a set temperature of 260° C. and 315° C., respectively. The molecular sieve material was purchased from Aldrich. Oxiclear column was regenerated in the original manufacture. The purified solvents and monomers were then chilled to about −15° C. by passing through a chiller before being fed into the reactor through a manifold. Solvent and monomers were mixed in the manifold and fed into reactor through a single tube. All liquid flow rates were measured using Brookfield mass flow meters or Micro-Motion Coriolis-type flow meters.

The catalyst was rac-dimethylsilylbisindenyl hafnium dimethyl (obtained from Albemarle) pre-activated with N,N-dimethylanilinium tetrakis (pentafluorophenyl) borate (obtained from Albemarle) at a molar ratio of about 1:1 in toluene. The catalyst solution was kept in an inert atmosphere with <1.5 ppm water content and was fed into the reactor by a metering pump through a separated line. Catalyst and monomer contact took place in the reactor. 3.37×10−7 moles/minute of the catalyst (activated in situ) was continuously added to the reactor.

As an impurity scavenger, 250 ml of tri-n-octyl aluminum (TNOA) (25 wt. % in hexane, Sigma Aldrich) was diluted in 22.83 kg hexane. The TNOA solution was stored in a 37.9-liter cylinder under nitrogen blanket. The solution was used for all polymerization runs until about 90% of consumption, and then a new batch was prepared. Pumping rates of the TNOA solution varied from polymerization reaction to reaction, ranging from 0 (no scavenger) to 4 ml per minute. In the experiment described here a scavenger flow of 1.8 ml/minute was used.

The reactor was first cleaned by continuously pumping solvent (e.g., hexane) and scavenger through the reactor system for at least one hour at a maximum allowed temperature (about 150° C.). After cleaning, the reactor was heated or cooled to the reaction temperature of 80° C. using a water/steam mixture flowing through the reactor jacket and controlled at a set pressure with controlled solvent flow. Monomers and catalyst solutions were then fed into the reactor when a steady state of operation was reached. Propylene was added at the rate of 14 g/minute while ethylene was measured volumetrically and added at the rate of 1,2 liter (measured at 0° C. and 1 bar pressure) per minute. An automatic temperature control system was used to control and maintain the reactor at a set temperature. Onset of polymerization activity was determined by observations of a viscous product and lower temperature of water-steam mixture. Once the activity was established and the system reached equilibrium, the reactor was lined out by continuing operating the system under the established condition for a time period of at least five times of mean residence time prior to sample collection. The resulting mixture, containing mostly solvent, polymer and unreacted monomers, was collected in a collection box after the system reached a steady state operation. The collected samples were first air-dried in a hood to evaporate most of the solvent, and then dried in a vacuum oven at a temperature of about 90° C. for about 12 hours. The vacuum oven dried samples were weighed to obtain yields. 12.0 grams/minute of the FPC polymer were recovered per minute. The polymer had a Brookfield viscosity of 41,000 cps at 190° C. and had an ethylene content of 14.5 wt. %. All the reactions were carried out at a pressure of about 2.41 MPa-g.

Procedures for production of PDC1 involved melt blending a sample corresponding to PDC3 at 250° C. in an extruder with 9 wt. % of Achieve 6936G (ExxonMobil Chemical Company; mhPP with MFR=1500±200 and $T_m$=156° C.; no peroxide but containing calcium stearate and Irganox 1076) an iPP made with metallocene catalysts and then extruded after cooling to approximately 160° C. through a multi-hole die with a pelletizing knife attached. The resulting extrudate was forced through the holes to form a strand about 6 mm (one-quarter inch) wide and then immediately pelletized underwater to form symmetrical pellets about 6 mm (one-quarter inch) on each dimension. The pellets were removed, dried and used as PDC1.

Blending was performed in a batch BRABENDER mixer with a batch size of about 225 g. For the formulations containing PP3155, the mixer was heated to 230° C. At a rotor speed of 30 rpm, PP3155 together with 1000 ppm IRGANOX™ 1010 and 750 ppm IRGAFOSV 168, based on the total weight of all the polymers, were added. Then the styrenic block copolymer was added. The speed was increased to 60 rpm for 1 minute. PDC was added slowly to prevent pooling in the mix, with the mixing speed slowed to 30-40 rpm. Mixing was continued for 5 minutes once all the PDC was incorporated in the blend. Finally the blend was discharged from the mixer and allowed to cool down.

For the formulations without PP3155, the mixer was again heated to 230° C. At a rotor speed of 30 rpm, the styrenic block copolymer and PDC together with 1000 ppm IRGANOX™ 1010 and 750 ppm IRGAFOS™ 168, based on the total weight of all the polymers, were added. The speed was increased to 60 rpm for 1 minute. With the speed slowed to 30-40 rpm, mixing was continued for 5 minutes until the polymer mixture became homogeneous. The blend was discharged from the mixer and allowed to cool down.

Molding of the KG 1650, KG 1657, and SBC/PDC blends involved compression-molding into 15 cm×15 cm×2 mm plaques using a press at 180° C., a molding time of 25 minutes, and a press force of 249 kN (25 tons). The molded plaque was discharged from the press and die-cut into specimens for various tests. For the high MW KG 1641H, a molding temperature of 230° C. was used. For the ultra-high MW KG 6944E, a homogeneous molded plaque was not obtained even at a molding temperature of 230° C. Micro-dumbbell specimens, having a 1 cm×1 cm base and a center, narrow strip measuring about 0.6 cm×0.2 cm, were cut from the molded plaques and stress-strain measurements under tension were performed in an Instron tester. Measurements using triplicate samples (conditioned under ambient conditions for 24 hr prior to tests) were performed at room temperature and at a separation speed of 850 μm/s (2-in./min). The stress was calculated based on the undeformed cross-sectional area of the test specimen. Strain measurements were based on clamp separation. The tensile toughness was measured as the total area under the stress-strain curve.

Examples 1-6 are directed to blends using the plasticizer SUNPAR™ 2280 (a Group II base stock process oil having a $KV_{100}$ of 31 cSt, a VI of 95, a pour point of –9° C., and a specific gravity of 0.899) or SUNPAR 150 (a Group II base stock process oil having a $KV_{100}$ of 11 cSt, a VI of 97, a pour point of –9° C., and a specific gravity of 0.881). The proportions of ingredients and resulting physical properties are shown in Table 2A and Table 2B below. Examples 2-6 are directed to blends with a mixture of 0.1 g of IRGANOX™ 1010 and 0.075 g of IRGAFOS™ 168 added. The proportions of ingredients and resulting physical properties are shown in Tables 3-7 below.

TABLE 2A

Formulations 1.1-1.6, blends with SUNPAR 2280

| | FORMULATION | | | | | |
|---|---|---|---|---|---|---|
| | 1.1 | 1.2 | 1.3 | 1.4 | 1.5 | 1.6 |
| Proportions (parts by weight) | | | | | | |
| KG1651 | 100.0 | 100.0 | 100.0 | 100.0 | | |
| KG1657M | | | | | 100.0 | 100.0 |
| SUNPAR 2280 | 200.0 | 150.0 | 100.0 | 50.0 | 200.0 | 150.0 |
| PP1105E1 | 45.0 | 45.0 | 45.0 | 45.0 | 45.0 | 45.0 |
| PDC3 | 0.0 | 50.0 | 100.0 | 150.0 | 0.0 | 50.0 |
| Wollastonite STPO | 100.0 | 100.0 | 100.0 | 100.0 | 100.0 | 100.0 |
| Physical Properties | | | | | | |
| MFR, dg/min | 18 | 666 | 71 | 58 | 319 | 654 |
| Hardness Sh A | 48 | 67 | 78 | 87 | 74 | 28 |
| Tensile Strength MPa | 6.0 | 9.7 | 13.9 | 19.4 | 6.2 | 1.8 |
| Ultimate Elongation (%) | 828 | 765 | 739 | 714 | 635 | 322 |
| Flexural Modulus (MPa) | 8.6 | 14.6 | 27.8 | 43.0 | 22.9 | 7.1 |
| Hysteresis, 200% extension, 2 cycles | | | | | | |
| Cycle 1 | | | | | | |
| Tension Set % | 47 | 54 | 54 | 56 | 63 | 53 |
| Total Energy (J) | 1.3 | 2.2 | 3.3 | 5.2 | 2.9 | 1.3 |
| Cycle 2 | | | | | | |
| Tension Set % | 28 | 42 | 46 | 54 | 61 | 42 |
| Total Energy (J) | 0.7 | 1.3 | 2.0 | 3.1 | 1.9 | 0.7 |

TABLE 2B

Formulations 1.7-1.12, blends with SUNPAR 2280

| | FORMULATION | | | | | |
|---|---|---|---|---|---|---|
| | 1.7 | 1.8 | 1.9 | 1.10 | 1.11 | 1.12 |
| Proportions (parts by weight) | | | | | | |
| KG1657M | 100.0 | 100.0 | | | | |
| KG MD6945M | | | 100.0 | 100.0 | 100.0 | 100.0 |
| SUNPAR 2280 | 100.0 | 50.0 | 200.0 | 150.0 | 100.0 | 50.0 |
| PP1105E1 | 45.0 | 45.0 | 45.0 | 45.0 | 45.0 | 45.0 |
| PDC3 | 100.0 | 150.0 | 0.0 | 50.0 | 100.0 | 150.0 |
| Wollastonite STPO | 100.0 | 100.0 | 100.0 | 100.0 | 100.0 | 100.0 |
| Physical Properties | | | | | | |
| MFR, dg/min | 315 | 153 | 2205 | 952 | 187 | 214 |
| Hardness shore A | 56 | 84 | | 53 | 69 | 81 |
| Tensile Strength MPa | 3.2 | 9.1 | | 3.0 | 6.6 | 10.3 |
| Ultimate Elongation (%) | 539 | 637 | | 524 | 664 | 729 |
| Flexural Modulus (MPa) | 12.6 | 37.8 | | 6.2 | 14.1 | 27.1 |
| Hysteresis, 200% extension, 2 cycles | | | | | | |
| Cycle 1 | | | | | | |
| Tension Set % | 66 | 56 | | 38 | 41 | 43 |
| Total Energy (J) | 1.9 | 4.4 | | 1.4 | 2.6 | 3.9 |
| Cycle 2 | | | | | | |
| Tension Set % | 60 | 53 | | 23 | 28 | 34 |
| Total Energy (J) | 1.3 | 2.5 | | 0.7 | 1.2 | 1.9 |

TABLE 3

Formulations 2.1-2.10

| | FORMULATION | | | | | | | | | |
|---|---|---|---|---|---|---|---|---|---|---|
| | 2.1 | 2.2 | 2.3 | 2.4 | 2.5 | 2.6 | 2.7 | 2.8 | 2.9 | 2.10 |
| Proportions (parts by weight) | | | | | | | | | | |
| KG 1641H | 40 | 40 | 40 | 40 | 40 | 40 | 60 | 60 | 60 | 60 |
| PP 3155 | — | — | 15 | 15 | 30 | 30 | 10 | 10 | — | — |
| PDC1 | 60 | — | 45 | — | 30 | — | 30 | — | 40 | — |
| PDC2 | — | 60 | — | 45 | — | 30 | — | 30 | — | 40 |

TABLE 3-continued

Formulations 2.1-2.10

| | FORMULATION | | | | | | | | | |
|---|---|---|---|---|---|---|---|---|---|---|
| | 2.1 | 2.2 | 2.3 | 2.4 | 2.5 | 2.6 | 2.7 | 2.8 | 2.9 | 2.10 |
| Physical Properties | | | | | | | | | | |
| Hardness (Sh A) | 66 | 60 | 84 | 81 | 90 | 90 | 72 | 76 | 59 | 56 |
| Tensile (100% Mod), MPa | 1.48 | 1.46 | 3.32 | 2.88 | 6.31 | 5.88 | 2.23 | 2.30 | 1.25 | 1.09 |
| 300% Modulus, MPa | 2.28 | 2.15 | 4.89 | 4.80 | 9.45 | 8.58 | 4.07 | 4.06 | 2.11 | 1.87 |
| Tensile Strength, MPa | 6.33 | 10.3 | 8.53 | 13.5 | 17.3 | 18.8 | 15.5 | 15.9 | 10.8 | 13.3 |
| Elongation at Break, % | 850 | 1100 | 640 | 840 | 620 | 730 | 910 | 920 | 1000 | 1120 |
| Compression Set | | | | | | | | | | |
| 25° C. | 22 | 14 | 42 | 43 | 56 | 53 | 23 | 27 | 17 | 21 |
| 100° C. | 82 | 95 | 65 | 75 | 65 | 62 | 51 | 55 | 53 | 79 |
| $T_m$, ° C. | 157 | 59 | 161 | 51, 164 | 166 | 167 | 164 | 166 | 157 | 62 |
| MFR, dg/min | 45 | 60 | 29 | 32 | 9.9 | 14 | 0.06 | 0.16 | 0.04 | 0.02 |

TABLE 4

Formulations 3.1-3.10

| | FORMULATION | | | | | | | | | |
|---|---|---|---|---|---|---|---|---|---|---|
| | 3.1 | 3.2 | 3.3 | 3.4 | 3.5 | 3.6 | 3.7 | 3.8 | 3.9 | 3.10 |
| Proportions (parts by weight) | | | | | | | | | | |
| KG 6944E | 40 | 40 | 40 | 40 | 40 | 40 | 60 | 60 | 60 | 60 |
| PP3155 | — | — | 15 | 15 | 30 | 30 | 10 | 10 | — | — |
| PDC1 | 60 | — | 45 | — | 30 | — | 30 | — | 40 | — |
| PDC2 | — | 60 | — | 45 | — | 30 | — | 30 | — | 40 |
| Physical Properties | | | | | | | | | | |
| Shore A Hardness | 61 | 60 | 83 | 83 | 91 | 91 | 75 | 72 | 58 | 58 |
| 100% Modulus, MPa | 1.19 | 1.10 | 3.15 | 3.57 | 6.12 | 5.98 | 2.36 | 2.30 | 1.27 | 1.23 |
| 300% Modulus, MPa | 2.04 | 1.82 | 4.85 | 5.72 | 9.55 | 9.08 | 5.06 | 4.91 | 2.59 | 2.26 |
| Tensile Strength, MPa | 8.43 | 2.92 | 9.09 | 7.19 | 23.0 | 25.1 | 18.8 | 18.1 | 11.7 | 12.8 |
| Elongation at Break, % | 880 | 530 | 600 | 420 | 720 | 780 | 800 | 790 | 820 | 870 |
| Tensile Toughness, MPa | 44 | 13 | 45 | 29 | 123 | 141 | 91 | 86 | 55 | 59 |
| Compression Set | | | | | | | | | | |
| 25° C. | 32 | 26 | 54 | 54 | 67 | 64 | 33 | 40 | 25 | 35 |
| 100° C. | 64 | 91 | 50 | 53 | 64 | 56 | 36 | 35 | 31 | 52 |
| $T_m$, ° C. | 36, 158 | 58 | 162 | 160 | 164 | 166 | 164 | 37, 165 | 37, 157 | 38 |
| MFR, dg/min | 11 | 11 | 3.2 | 4.6 | 2.4 | 2.6 | ** | ** | ** | ** |

Note for Table 4:
**Hard to force out of barrel

TABLE 5

Formulations 4.1-4.7

| | FORMULATION | | | | | | |
|---|---|---|---|---|---|---|---|
| | 4.1 | 4.2 | 4.3 | 4.4 | 4.5 | 4.6 | 4.7 |
| Proportions (parts by weight) | | | | | | | |
| KG 1650 | 100 | 90 | 80 | 80 | — | — | — |
| KG 1657 | — | — | — | — | 100 | 90 | 80 |
| PDC3 | — | 10 | 20 | — | — | 10 | 20 |

TABLE 5-continued

Formulations 4.1-4.7

| | FORMULATION | | | | | | |
|---|---|---|---|---|---|---|---|
| | 4.1 | 4.2 | 4.3 | 4.4 | 4.5 | 4.6 | 4.7 |
| SUNPAR 150 | — | — | — | 20 | — | — | — |
| Physical Properties | | | | | | | |
| Shore A Hardness | 81 | 73 | 72 | 53 | 53 | 54 | 53 |
| 100% Modulus, MPa | 2.82 | 1.94 | 1.92 | 1.72 | 1.20 | 0.99 | 1.00 |
| 300% Modulus, MPa | 5.03 | 3.25 | 3.17 | 2.73 | 1.68 | 1.38 | 1.41 |
| Tensile Strength, MPa | 19.3 | 13.3 | 16.0 | 6.83 | 8.50 | 8.56 | 8.37 |
| Elongation at Break, % | 630 | 730 | 790 | 760 | 870 | 1040 | 1070 |
| Tensile Toughness, MPa | 64 | 54 | 65 | 38 | 39 | 46 | 48 |
| MFR, dg/min | <1 | 0.23 | 0.46 | 3.8 | 9.9 | 15 | 19 |

TABLE 6

Formulations 5.1-5.11

| | FORMULATION | | | | | | | | | | |
|---|---|---|---|---|---|---|---|---|---|---|---|
| | 5.1 | 5.2 | 5.3 | 5.4 | 5.5 | 5.6 | 5.7 | 5.8 | 5.9 | 5.10 | 5.11 |
| Proportions (parts by weight) | | | | | | | | | | | |
| KG 1641H | 100 | 40 | 40 | 40 | 40 | 40 | 40 | 60 | 60 | 60 | 60 |
| PP3155 | — | — | — | 15 | 15 | 30 | 30 | 10 | 10 | — | — |
| PDC3 | — | 60 | — | 45 | — | 30 | — | 30 | — | 40 | — |
| SUNPAR 150 | — | — | 60 | — | 45 | — | 30 | — | 30 | — | 40 |
| Physical Properties | | | | | | | | | | | |
| 1% Sec Mod, MPa (kpsi) | | 4.54 (0.658) | * | 14.8 (2.15) | 4.87 (0.706) | 76.5 (11.1) | 56.6 (8.21) | 9.65 (1.40) | 7.72 (1.12) | 4.0 (0.580) | * |
| Shore A Hardness | 76 | 50 | 9.4 | 71 | 45 | 89 | 82 | 65 | 49 | 51 | 27 |
| 100% Modulus, MPa | 1.70 | 0.72 | 0.24 | 1.55 | 2.05 | 4.46 | 7.88 | 1.37 | 2.26 | 0.72 | 1.05 |
| 300% Modulus, MPa | 2.54 | 1.01 | 0.45 | 2.03 | 4.44 | 6.91 | 13.0 | 2.66 | 4.55 | 1.20 | 2.06 |
| Tensile Strength, MPa | 12.9 | 1.01 | 12.4 | 2.03 | 21.8 | 11.2 | 33.8 | 7.38 | 27.9 | 2.03 | 25.2 |
| Elongation at Break, % | 940 | 300 | 2100 | 340 | 1210 | 610 | 870 | 750 | 1150 | 580 | 1580 |
| Compression Set | | | | | | | | | | | |
| 25° C. | | 21 | 1.3 | 28 | 21 | 50 | 25 | 19 | 10 | 25 | 7.7 |
| 100° C. | | 100 | 99* | 84 | 79 | 75 | 70 | 64 | 54 | 90 | 54 |
| $T_m$, ° C. | — | — | — | 166 | 154 | 165 | 153 | 166 | 150 | — | — |
| MFR, dg/min | <1 | 22 | 16 | 20 | 1.3 | 11 | 8.3 | 0.10 | ** | 1.6 | 0.10 |

Notes for Table 6:
*Too soft to mount on supports
**Hard to force out of barrel

TABLE 7

Formulations 6.1-6.10

| | FORMULATION | | | | | | | | | |
|---|---|---|---|---|---|---|---|---|---|---|
| | 6.1 | 6.2 | 6.3 | 6.4 | 6.5 | 6.6 | 6.7 | 6.8 | 6.9 | 6.10 |
| Proportions (parts by weight) | | | | | | | | | | |
| KG 6944E | 40 | 40 | 40 | 40 | 40 | 40 | 60 | 60 | 60 | 60 |
| PP3155 | — | — | 15 | 15 | 30 | 30 | 10 | 10 | — | — |
| PDC3 | 60 | — | 45 | — | 30 | — | 30 | — | 40 | — |
| SUNPAR 150 | — | 60 | — | 45 | — | 30 | — | 30 | — | 40 |
| Physical Properties | | | | | | | | | | |
| 1% Sec Mod, kpsi | 0.544 | 0.356 | 3.09 | 7.93 | 1.55 | 1.75 | 1.83 | 1.32 | 0.600 | 0.360 |
| Shore A Hardness | 49 | 12 | 74 | 84 | 90 | 54 | 68 | 56 | 54 | 33 |

TABLE 7-continued

Formulations 6.1-6.10

| | FORMULATION | | | | | | | | | |
|---|---|---|---|---|---|---|---|---|---|---|
| | 6.1 | 6.2 | 6.3 | 6.4 | 6.5 | 6.6 | 6.7 | 6.8 | 6.9 | 6.10 |
| 100% Modulus, MPa | 0.66 | 0.40 | 2.10 | 3.65 | 5.09 | 3.00 | 4.22 | 3.13 | 1.96 | 0.94 |
| 300% Modulus, MPa | 1.07 | 0.71 | 3.56 | 5.99 | 7.94 | 5.96 | 9.55 | 6.46 | 3.96 | 1.81 |
| Tensile Strength, MPa | 1.86 | 5.36 | 5.85 | 19.5 | 17.5 | 25.5 | 36.1 | 33.2 | 8.23 | 6.02 |
| Elongation at Break, % | 600 | 940 | 570 | 840 | 700 | 940 | 820 | 920 | 550 | 640 |
| Compression Set | | | | | | | | | | |
| 25° C. | 52 | 3.2 | 50 | 31 | 65 | 22 | 29 | 18 | 48 | 20 |
| 100° C. | 100 | 27 | 52 | 53 | 60 | 42 | 31 | 36 | 45 | 30 |
| $T_m$, ° C. | — | — | 167 | 155 | 166 | 153 | 165 | 156 | — | — |
| MFR, dg/min | 8.7 | 0.08 | 4.1 | 1.6 | 1.5 | 0.69 | ** | ** | 0.10 | ** |

Notes for Table 7:
**Hard to force out of barrel

Figure 2:
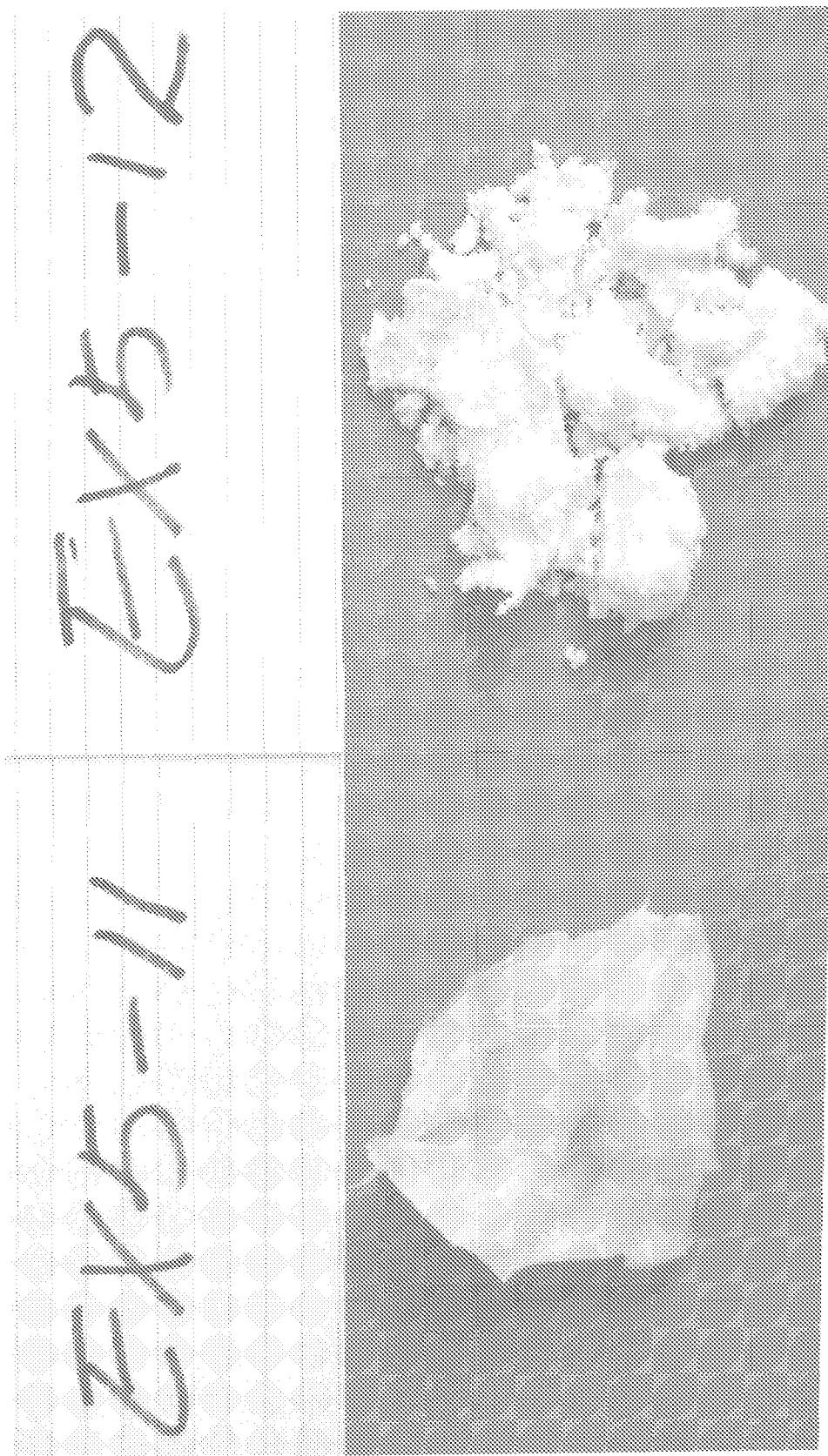
FIG. 2 is a photographic comparison of Formulations 5.11 (inventive composition) and 5.12 (prior art) from the Examples.
Figure 3:
FIG. 3 is a photographic comparison of Formulations 5.8 (inventive composition) and 5.9 (prior art) from the Examples.
Figure 4:
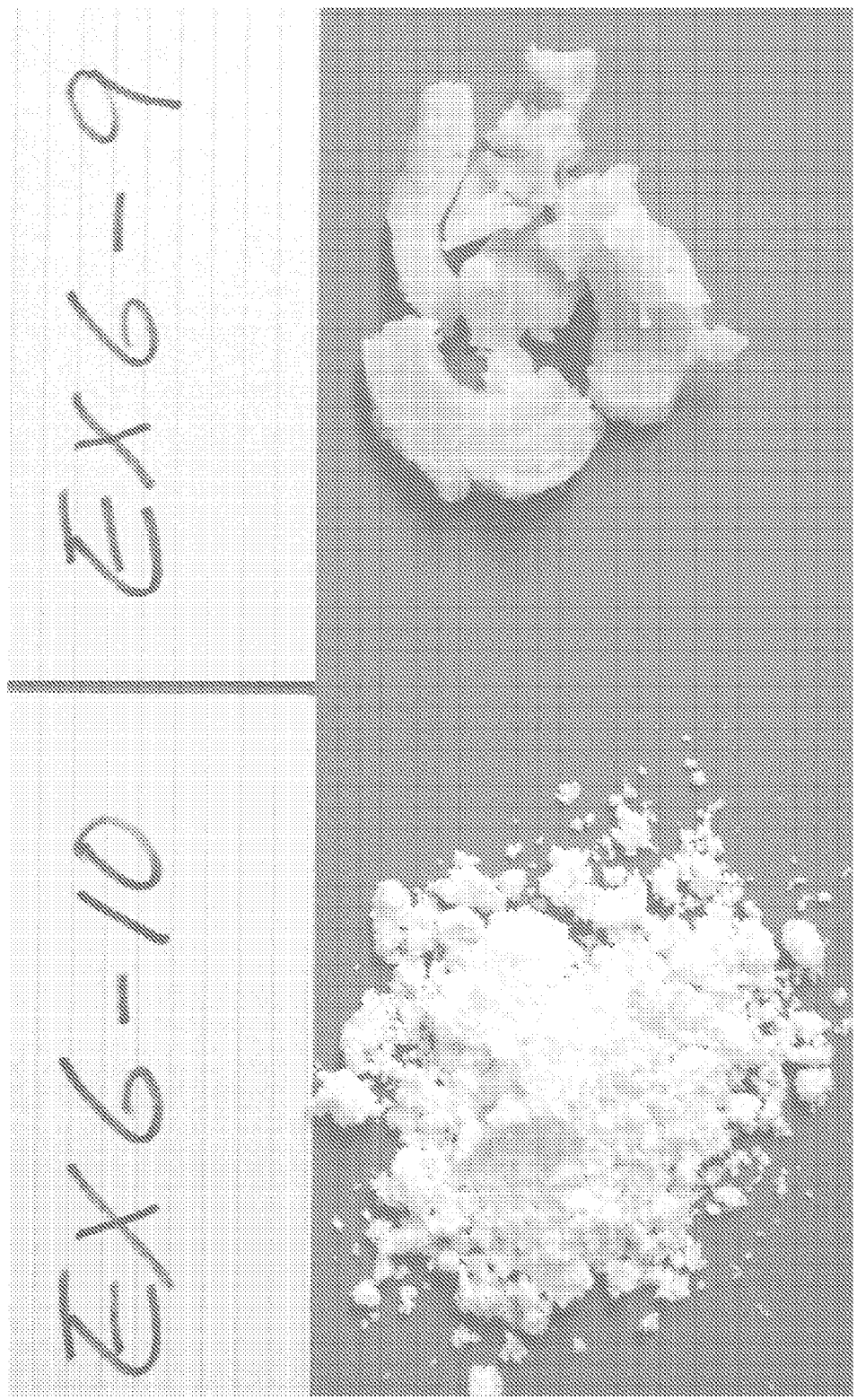
FIG. 4 is a photographic comparison of the Formulations 6.10 (prior art) and 6.9 (inventive composition) from the Examples.
Figure 5:
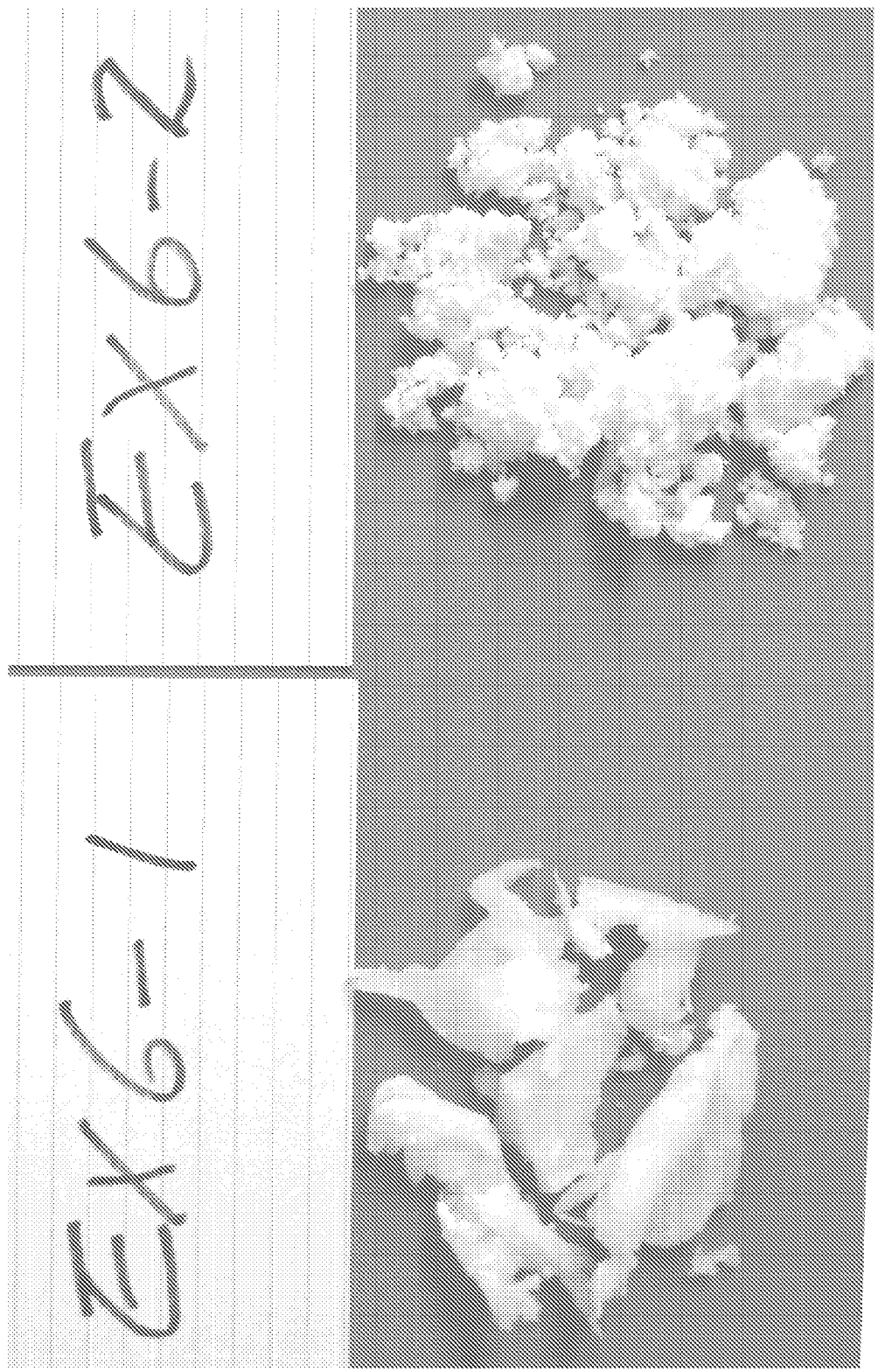
FIG. 5 is a photographic comparison of Formulations 6.1 (inventive composition) and 6.2 (prior art) from the Examples.

As seen in FIGS. 2 to 5, blends comprising PDC and SBC are exceptionally processable since the pieces of the polymer blend are smooth and non fibrous while those of the comparative blends are crumbly and inhomogeneous. In addition they have a lower viscosity than corresponding blends made with process oil. This is unexpected in view of the lower viscosity of process oil compared to PDC. FIGS. 2 to 5 show comparative illustration of blends of SBCs and PDC along with identical compositions of SBC and process oil. In all cases, unexpectedly, the blends with PDC were more easily fabricated, had a lower viscosity and were easier to process than the compositions with process oil.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention. All priority documents are herein fully incorporated by reference for all jurisdictions in which such incorporation is permitted. Further, all documents cited herein, including testing procedures, are herein fully incorporated by reference to the extent they are not inconsistent with the invention herein for all jurisdictions in which such incorporation is permitted.

What is claimed is:

1. A polymeric composition comprising:
   from about 1 to about 99 wt. %, based on the total weight of hydrocarbons in the polymeric composition, of a propylene copolymer component comprising a at least one or more copolymers comprising at least 65 wt. % propylene (based upon the weight of the copolymer), wherein the copolymer has an MFR greater than 1,000 dg/min, an annealed heat of fusion between 0.5 and 40 J/g, and an isotactic triad fraction of at least 75%;
   blended therewith, from about 99 to about 1 wt. %, based on the total weight of hydrocarbons in the polymeric composition, of a styrenic block copolymer component comprising one or more elastomeric styrenic block copolymers; and
   wherein the polymeric composition has an MFR of at least 200 dg/min and a flexural modulus greater than 1 MPa and less than 100 MPa
   wherein the polymeric composition has an MFR-tensile number greater than 10,000 according to the equation:

$MTN=(MFR)^2(M)^{1/2}$ wherein MTN is the MFR-tensile number, MFR is the melt flow rate of the polymeric composition in dg/min and M is the tensile modulus at break in MPa.

2. The polymeric composition of claim 1, wherein the MFR of the polymeric composition has an MFR of at least 300 dg/min.

3. The polymeric composition of claim 1, wherein the MFR of the polymeric composition has an MFR of at least 500 dg/min.

4. The polymeric composition of claim 1, wherein the propylene copolymer has:
   a melting point between 25° C. and 110° C.;
   a heat of fusion from 1.0 to 125 J/g;
   a tacticity index (m/r) from 4 to 12;
   a reactivity ratio product $r_1 r_2$ of less than 1.5; and
   an Mw/Mn between 1.5 and 40.

5. The polymeric composition of claim 1, wherein the propylene copolymer has one or more of the following characteristics:
   a) an elasticity in % equal to or less than 0.935M+12 where M is the 500% tensile modulus in MPa and is at least 0.5 MPa;
   b) a proportion of inversely inserted propylene units greater than 0.5%, based on 2.1 insertion of propylene monomer in all propylene insertions;
   c) a proportion of inversely inserted propylene units greater than 0.05%, based on 1.3 insertion of propylene monomer in all propylene insertions; and
   d) less than 10000 ppm by weight of the copolymer of a molecular degradation agent or its reaction products.

6. The polymeric composition of claim 1, wherein the propylene-dominated copolymer component comprises two or more propylene copolymers.

7. The polymeric composition of claim 1, wherein the styrenic block copolymer component has an MFR of from 0.1 to 150.

8. The polymeric composition of claim 1, wherein the polymeric composition has an MFR-tensile number greater than 30,000 according to the equation:

$MTN=(MFR)^2(M)^{1/2}$ wherein MTN is the MFR-tensile number, MFR is the melt flow rate of the polymeric composition in dg/min and M is the tensile modulus at break in MPa.

9. The polymeric composition of claim 8, wherein the MFR-tensile number is greater than 50,000.

10. The polymeric composition of claim 1, wherein the propylene-dominated copolymer component comprises from 5 to 50 wt. % by weight of the hydrocarbon components of the blend, and the styrenic block copolymer component comprises from 95 to 50 wt. % by weight of the hydrocarbon components of the blend.

11. The polymeric composition of claim 1, wherein the propylene copolymer comprises from about 0.5 to about 3 wt. % diene, based upon the weight of the propylene copolymer.

12. The polymeric composition of claim 1, further comprising from about 1 to about 98% by weight of the hydrocarbon components of the blend of a tertiary polymer component having a melting point greater than about 110° C. and selected from the group consisting of propylene homopolymers, random propylene copolymers and propylene-styrene block copolymers.

13. The polymeric composition of claim 12, wherein the tertiary polymer component is selected from isotactic polypropylene, and random copolymers of propylene and α-olefins including ethylene, wherein the tertiary polymer component contains at least 90% by weight of the tertiary polymer component of propylene.

14. The polymeric composition of claim 1, further comprising from 2 to 200 parts by weight of a plasticizer per hundred parts by weight of total polymer.

15. A process for making the polymeric composition of claim 1, comprising melt blending the propylene-dominated copolymer component and the styrenic block copolymer component.

16. The process of claim 15, further comprising melt blending with the propylene-dominated copolymer and styrenic block copolymer components a tertiary polymer component having a melting point greater than about 110° C. and selected from the group consisting of propylene homopolymers, random propylene copolymers and propylene-styrene block copolymers.

17. The process of claim 15, further comprising forming a film, fabric, fiber, sheet, molded object, extruded form or thermoformed article from the melt.

18. The process of claim 17, further comprising weld bonding the film, fabric, fiber, sheet, molded object, extruded form or thermoformed article to a polypropylene substrate.

19. The polymeric composition of claim 1 in a film, fabric, fiber, sheet, molded object, extruded form or thermoformed article.

20. The polymeric composition obtained from the process of claim 15.

* * * * *